United States Patent
Wang et al.

(10) Patent No.: US 11,483,719 B2
(45) Date of Patent: Oct. 25, 2022

(54) METHOD AND APPARATUS FOR BEAM CONFIGURATION IN WIRELESS COMMUNICATION SYSTEM

(71) Applicant: SAMSUNG ELECTRONICS CO., LTD., Suwon-si (KR)

(72) Inventors: Huiyang Wang, Beijing (CN); Yi Zhao, Beijing (CN); Chanjuan Wei, Beijing (CN); Jing Zhu, Beijing (CN); Hao Ni, Beijing (CN); Meifang Jing, Beijing (CN); Xiaohui Yang, Beijing (CN); Ranran Zhang, Beijing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/018,683

(22) Filed: Sep. 11, 2020

(65) Prior Publication Data

US 2021/0120434 A1    Apr. 22, 2021

(30) Foreign Application Priority Data

Oct. 17, 2019 (CN) .......................... 201910989381.3

(51) Int. Cl.
*H04W 16/28* (2009.01)
*H04W 72/04* (2009.01)
*H04W 88/08* (2009.01)

(52) U.S. Cl.
CPC ......... *H04W 16/28* (2013.01); *H04W 72/046* (2013.01); *H04W 88/08* (2013.01)

(58) Field of Classification Search
CPC ... H04W 16/28; H04W 72/046; H04W 88/08; H04W 72/048; H04W 72/08; H04B 7/0617
See application file for complete search history.

(56) References Cited

U.S. PATENT DOCUMENTS

| | | | |
|---|---|---|---|
| 9,521,554 B2 | 12/2016 | Farajidana et al. | |
| 9,883,523 B2 | 1/2018 | Ko et al. | |
| 2015/0071367 A1 | 3/2015 | Hwang et al. | |
| 2017/0150419 A1* | 5/2017 | Li | H04B 7/024 |

(Continued)

FOREIGN PATENT DOCUMENTS

| | | |
|---|---|---|
| KR | 10-1192415 B1 | 10/2012 |
| KR | 10-1238390 B1 | 2/2013 |

(Continued)

OTHER PUBLICATIONS

International Search Report (PCT/ISA/210) and Written Opinion (PCT/ISA/237) dated Jan. 15, 2021 issued by the International Searching Authority in International Application No. PCT/KR2020/013620.

(Continued)

*Primary Examiner* — Hassan Kizou
*Assistant Examiner* — Abdullahi Ahmed
(74) *Attorney, Agent, or Firm* — Sughrue Mion, PLLC

(57) ABSTRACT

An apparatus for beam configuration in a wireless communication system, including a transceiver; and at least one processor connected with the transceiver and configured to: form at least one beam cluster from beams of a base station; determine a configuration of the at least one beam cluster; and configure the beams in the at least one beam cluster according to the determined configuration

17 Claims, 31 Drawing Sheets

(56) References Cited

U.S. PATENT DOCUMENTS

| | | | |
|---|---|---|---|
| 2018/0042000 A1 | 2/2018 | Zhang et al. | |
| 2019/0058518 A1* | 2/2019 | Koskela | H04B 7/0617 |
| 2019/0089499 A1 | 3/2019 | Nam et al. | |
| 2019/0181935 A1 | 6/2019 | Karjalainen et al. | |
| 2019/0230668 A1 | 7/2019 | Dong et al. | |
| 2020/0037297 A1 | 1/2020 | Pan et al. | |
| 2020/0077411 A1* | 3/2020 | Raghavan | H04W 72/048 |
| 2020/0288412 A1* | 9/2020 | Ajdakple | H04W 80/02 |
| 2020/0329414 A1* | 10/2020 | Talukdar | H04W 76/15 |
| 2020/0359434 A1* | 11/2020 | Raghavan | H04W 72/042 |
| 2021/0112550 A1* | 4/2021 | Lekutai | H04W 52/243 |
| 2021/0242928 A1* | 8/2021 | Park | G06N 3/08 |

FOREIGN PATENT DOCUMENTS

| | | | |
|---|---|---|---|
| KR | 10-2016-0081812 A | 7/2016 | |
| KR | 10-2019-0069407 A | 6/2019 | |
| WO | 2018/175442 A1 | 9/2018 | |
| WO | 2019/032882 A1 | 2/2019 | |

OTHER PUBLICATIONS

Ulrich Barth "Howto reduce-green house gas emissions from ICT Equipment" ETSI Green Agenda, Wireless Networks, EARTH research project, Nov. 26, 2009, (15 pages total).
Yue Xu et al. "High-Accuracy Wireless Traffic Prediction: A GP-Based Machine Learning Approach" Research Gate, Conference Paper, Dec. 2017, (7 pages total).
Communication dated Jun. 2, 2022 issued by the European Patent Office in counterpart European Application No. 20875733.6.

\* cited by examiner 401　　　402　　　403

FIG. 5

| beam number | adjacent beam number |
|---|---|
| 876 | 98,304,343 |
| 876 | 98,304,343 |

⟹ text recognition for the beam handover table

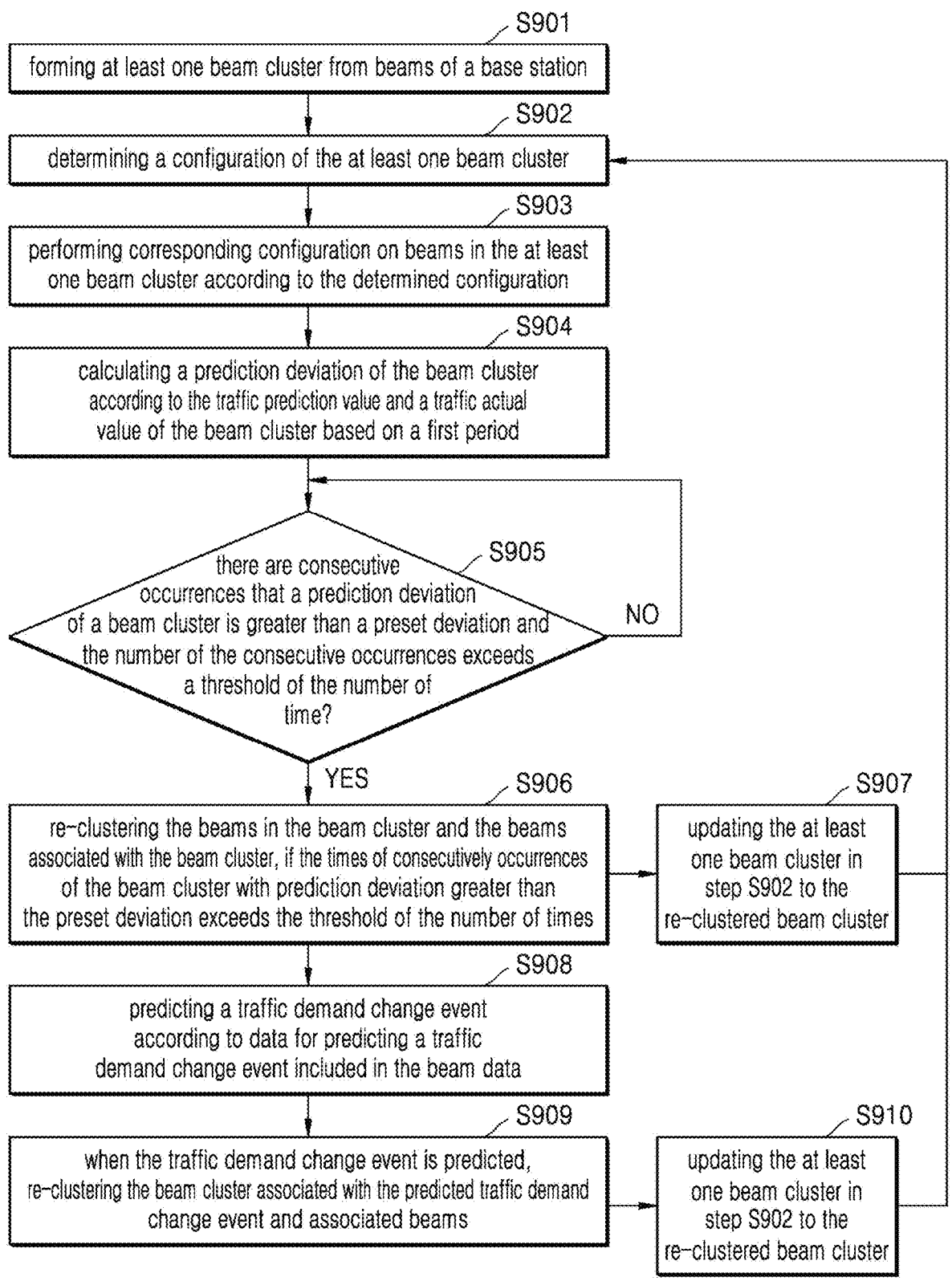

METHOD AND APPARATUS FOR BEAM CONFIGURATION IN WIRELESS COMMUNICATION SYSTEM

CROSS-REFERENCE TO RELATED APPLICATION

This application is based on and claims priority under 35 U.S.C. § 119 to Chinese Patent Application No. 201910989381.3, filed on Oct. 17, 2019, in the China National Intellectual Property Administration, the disclosure of which is incorporated by reference herein in its entirety.

BACKGROUND

1. Field

The disclosure relates to a field of wireless communication technique, and more particularly, to a method and an apparatus for beam configuration in a wireless communication system.

2. Description of Related Art

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which may be a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is needed.

SUMMARY

Provided are a beam configuring method and device, an electronic apparatus and a computer readable storage medium, which may solve the problem caused by the problems of uneven distribution of users, different types of services, and the time-varying number of users in the cell.

Additional aspects will be set forth in part in the description which follows and, in part, will be apparent from the description, or may be learned by practice of the presented embodiments.

In accordance with an aspect of the disclosure, an apparatus for beam configuration in a wireless communication system includes a transceiver; and at least one processor connected with the transceiver and configured to: form at least one beam cluster from beams of a base station; determine a configuration of the at least one beam cluster; and configure the beams in the at least one beam cluster according to the determined configuration.

The at least one processor may be further configured to: collect beam data of the beams of the base station, wherein the beam data may include at least communication data, and form the at least one beam cluster from the beams of the base station according to the beam data.

The communication data may include at least one of user location information, current time information, service type information about at least one beam, service traffic information about the at least one beam, service distribution information about the at least one beam, synchronization signal period information the at least one beam, transmitting power information about the at least one beam, signal quality information, or beam number information.

The service type information may include at least one of statistics of users' moving speed, a service quality level identification of a signal, or an uplink/downlink data ratio, and the service traffic information may include at least one of a throughput, a resource block usage rate, an amount of internet protocol (IP) data packet, or a number of accessed users.

The at least one processor may be further configured to: cluster at least one beam having a same feature into one beam cluster of the at least one beam cluster according to the beam data.

The at least one processor may be further configured to: extract service feature information about the beams from the communication data in the beam data, wherein the service feature information may include at least one of service traffic information, service type information, and service distribution information; and cluster the at least one beam having the same feature into the one beam cluster according to the extracted service feature information.

The at least one beam may include a first beam having a first feature and a second beam having a second feature, and the at least one processor may be further configured to determine a feature similarity between the first feature and the second feature, and based on determining that the feature similarity exceeds a threshold similarity, cluster the first beam and the second beam into the one beam cluster according to the extracted service feature information.

The at least one processor may be further configured to cluster the at least one beam having the same feature into the one beam cluster based on an average displacement polymerization based on the beam data.

The at least one processor may be further configured to: acquire sample points corresponding to the beam data; select one sample point as a center randomly from among the sample points, and determine other sample points within a preset radius range of the center; calculate an average displacement vector of displacement vectors of the other sample points within the preset radius range; cluster other beams corresponding to the other sample points according to the average displacement vector; and by using sample points of un-clustered beams as the sample points, repeat the selecting, the calculating, and the clustering as long as the un-clustered beams remain.

The at least one processor may be further configured to: acquire a service intensity heat map corresponding to the base station; and cluster at least one beam of the base station into one beam cluster of the at least one beam cluster based on color similarity in the service intensity heat map.

The at least one processor may be further configured to: determine a handover correlation between the beams according to a beam handover relationship corresponding to the base station; and cluster at least one beam of the base station into one beam cluster of the at least one beam cluster based on the handover correlation between the beams.

The at least one processor may be further configured to: calculate a traffic prediction value of the at least one beam cluster; and determine the configuration of the at least one beam cluster based on the traffic prediction value of the at least one beam cluster, wherein the configuration of the at least one beam cluster may include at least one of a period of a synchronization signal block (SSB), a power level, a beam cluster bandwidth, a direction of the at least one beam cluster, or an ON/OFF state of the at least one beam cluster.

The at least one processor may be further configured to: determine parameters of each time period kernel in a prediction model according to communication data in beam data of each beam in the at least one beam cluster, obtain the prediction model based on time sequences, wherein the prediction model may include a period kernel having a period granularity is based on hour; and determine the traffic prediction value for the at least one beam cluster at a predetermined time using the prediction model based on the time sequences.

After the beams in the at least one beam cluster are configured, the at least one processor may be further configured to: calculate a prediction deviation of the at least one beam cluster according to a traffic prediction value and an actual traffic value of the at least one beam cluster; determine whether to re-cluster the beams and other beams associated with the at least one beam cluster based on the calculated prediction deviation; determine a re-cluster configuration of a re-clustered beam cluster obtained by the re-clustering; and configure the beams and the other beams in the re-clustered beam cluster according to the determined re-cluster configuration.

The at least one processor may be further configured to: collect beam data of the beams of the base station, wherein the beam data may include at least data for predicting traffic demand change events, predict a traffic demand change event according to data for predicting the traffic demand change event included in the beam data; based on determining that the at least one beam cluster is associated with the predicted traffic demand change event, re-cluster the beams in the at least one beam cluster and other beams associated with the at least one beam cluster, when the traffic demand change event is predicted; determine a re-cluster configuration of a re-clustered beam cluster obtained by the re-clustering; and configure the beams and the other beams in the re-clustered beam cluster according to the determined re-cluster configuration.

The data for predicting the traffic demand change event may include at least one of climate data, network application data, multimedia data, transportation data, public utility data, or holiday data.

In accordance with an aspect of the disclosure, a method for beam configuration in a wireless communication system includes forming at least one beam cluster from beams of a base station; determining a configuration of the at least one beam cluster; and configuring the beams in the at least one beam cluster according to the determined configuration.

The method may further include calculating a prediction deviation of the at least one beam cluster according to a traffic prediction value and an actual traffic value of the at least one beam cluster; determining whether to re-cluster the beams and other beams associated with the at least one beam cluster based on the calculated prediction deviation; determining a re-cluster configuration of a re-clustered beam cluster obtained by the re-clustering; and configuring the beams and the other beams in the re-clustered beam cluster according to the determined re-cluster configuration.

In accordance with an aspect of the disclosure, a non-transitory computer readable storage medium is configured to store instructions which, when executed by at least one processor of a device for beam configuration, cause the at least one processor to form at least one beam cluster from beams of a base station; determine a configuration of the at least one beam cluster; and configure the beams in the at least one beam cluster according to the determined configuration.

The instructions may be further configured to cause the at least one processor to, after the beams in the at least one beam cluster are configured: calculate a prediction deviation of the at least one beam cluster according to a traffic prediction value and an actual traffic value of the at least one beam cluster; determine whether to re-cluster the beams and other beams associated with the at least one beam cluster based on the calculated prediction deviation; determine a re-cluster configuration of a re-clustered beam cluster obtained by the re-clustering; configure the beams and the other beams in the re-clustered beam cluster according to the determined re-cluster configuration.

BRIEF DESCRIPTION OF THE DRAWINGS

The above and other objects and features of certain embodiments of the present disclosure will become more apparent from the following description taken in conjunction with the accompanying drawings, in which:

FIG. 5 illustrates a beam handover relationship of a base station according to an exemplary embodiment of the disclosure;

FIG. 9F illustrates a flowchart of a beam configuring method, according to an exemplary embodiment of the disclosure;

DETAILED DESCRIPTION

Figure 1A:
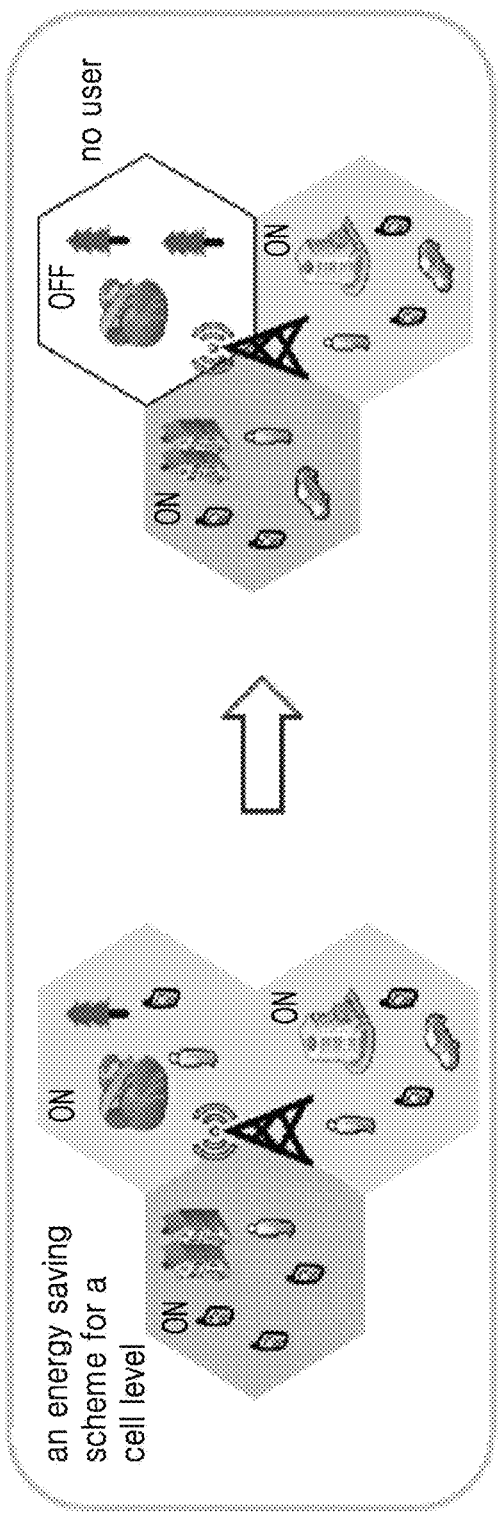
FIG. 1A illustrates a schematic diagram of an energy saving scheme for a cell level in the related art.

The following description with reference to accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

While describing the embodiments, technical content that is well known in the related fields and not directly related to the disclosure will not be provided. By omitting redundant descriptions, the essence of the disclosure will not be obscured and may be clearly explained.

For the same reasons, components may be exaggerated, omitted, or schematically illustrated in drawings for clarity. Also, the size of each component does not completely reflect the actual size. In the drawings, like reference numerals denote like elements.

As used herein, the term "and/or" includes any and all combinations of one or more of the associated listed items. Expressions such as "at least one of," when preceding a list of elements, modify the entire list of elements and do not modify the individual elements of the list. Throughout the disclosure, the expression "at least one of a, b or c" indicates only a, only b, only c, both a and b, both a and c, both b and c, all of a, b, and c, or variations thereof.

Advantages and features of one or more embodiments of the disclosure and methods of accomplishing the same may be understood more readily by reference to the following detailed description of the embodiments and the accompanying drawings. In this regard, the present embodiments may have different forms and should not be construed as being limited to the descriptions set forth herein. Rather, these embodiments are provided so that this disclosure will be thorough and complete and will fully convey the concept of the present embodiments to one of ordinary skill in the art, and the disclosure will only be defined by the appended claims.

Here, it will be understood that combinations of blocks in flowcharts or process flow diagrams may be performed by computer program instructions. Because these computer program instructions may be loaded into a processor of a general purpose computer, a special purpose computer, or another programmable data processing apparatus, the instructions, which are performed by a processor of a computer or another programmable data processing apparatus, create units for performing functions described in the flowchart block(s). The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufacturing items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It should also be noted that in some alternative implementations, functions mentioned in blocks may occur out of order. For example, two blocks illustrated consecutively may actually be executed substantially concurrently, or the blocks may sometimes be performed in a reverse order according to the corresponding function.

Here, the term "unit" in the embodiments of the disclosure means a software component or hardware component such as a field-programmable gate array (FPGA) or an application-specific integrated circuit (ASIC) and performs a specific function. However, the term "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with a smaller number of components and "units", or may be divided into additional components and "units". Furthermore, the components and "units" may be embodied to reproduce one or more central processing units (CPUs) in a device or security multimedia card. Also, in the embodiments, the "unit" may include at least one processor. In the disclosure, a controller may also be referred to as a processor.

A wireless communication system has evolved from providing initial voice-oriented services to, for example, a broadband wireless communication system providing a high-speed and high-quality packet data service, such as communication standards of high speed packet access (HSPA), long-term evolution (LTE) or evolved universal terrestrial radio access (E-UTRA), and LTE-Advanced (LTE-A) of 3GPP, high rate packet data (HRPD) and ultra mobile broadband (UMB) of 3GPP2, and IEEE 802.16e. A 5th generation (5G) or new radio (NR) communication standards are being developed with 5G wireless communication systems.

Hereinafter, one or more embodiments will be described with reference to accompanying drawings. Also, in the description of the disclosure, certain detailed explanations of related functions or configurations are omitted when it is deemed that they may unnecessarily obscure the essence of the disclosure. All terms including descriptive or technical terms which are used herein should be construed as having meanings that are obvious to one of ordinary skill in the art. However, the terms may have different meanings according to an intention of one of ordinary skill in the art, precedent cases, or the appearance of new technologies, and thus, the terms used herein have to be defined based on the meaning of the terms together with the description throughout the specification. Hereinafter, a base station may be a subject performing resource assignment of a terminal, and may be at least one of a gNode B, an eNode B, a Node B, a base station (BS), a wireless access unit, a base station controller, and a node on a network. A terminal may include user equipment (UE), a mobile station (MS), a cellular phone, a smart phone, a computer, or a multimedia system capable of performing communication functions, or the like. In the disclosure, a DL is a wireless transmission path of a signal transmitted from a base station to a terminal, and a UL is a wireless transmission path of a signal transmitted from a terminal to a base station. Throughout the specification, a layer (or a layer apparatus) may also be referred to as an entity. Also, hereinbelow, one or more embodiments of the disclosure will be described as an example of an LTE or LTE-A system, but the one or more embodiments may also be applied to other communication systems having a similar technical background or channel form. For example, 5G mobile communication technology (5G, new radio, NR) developed after LTE-A may be included. In addition, the one or more embodiments may be applied to other communication systems through some modifications within the scope of the disclosure without departing from the scope of the disclosure according to a person skilled in the art.

In an LTE system as a representative example of the broadband wireless communication system, an orthogonal frequency division multiplexing (OFDM) scheme is used in a DL and a single carrier frequency division multiplexing (SC-FDMA) scheme is used in a UL. The UL refers to a wireless link through which a terminal, UE, or a MS transmits data or control signals to a BS or a gNode B, and the DL refers to a wireless link through which a BS transmits data or control signals to a terminal. In such a multiple access scheme, data or control information of each user is classified by generally assigning and operating the data or control information such that time-frequency resources for transmitting data or control information for each user do not overlap each other, that is, such that orthogonality is established.

Terms such as a physical channel and a signal in an existing LTE or LTE-A system may be used to describe methods and apparatuses suggested in the disclosure. However, the content of the disclosure is applied to a wireless communication system, instead of the LTE or LTE-A system.

In a 5G network, deployment of base stations is denser and the number of the base stations is also larger, and energy consumption of the base stations is a significant expenditure for operators. Therefore, energy saving technology for base station is particularly important in 5G networks. For the energy saving of the base stations, the related art is mainly divided into two categories:

(A first category may relate to energy saving based on cell. It controls in units of cell, and performs overall switching control of cell's Radio Unit (RU), Digital Unit (DU) and Control Unit (CU) on a cell, to implement energy saving of the base station to which the cell belongs. When there is no user access in the cell at all, the cell is turned off, that is, the RU, DU, and CU of the cell are turned off.

A second category may relate to energy saving based on carrier. It controls in units of carrier, and performs overall switching control on a carrier. When there is no user access in a carrier at all, the carrier is turned off. The method of turning off the carrier can be implemented by changing the configuration information of the base station.

The problems of the related art mainly include the following three aspects:

As a first aspect, in the aspect of space, the traffic distribution in different areas of the cell or the carrier is uneven, resulting in poor energy saving effect.

Generally, the coverage of a cell or a carrier is relatively large, and it is a rare case that there is no user access thereto. Therefore, the switching control for the coverage of cells or carriers may be always turned on according to the related art solution. However, the distribution of users in the coverage of a cell or a carrier is often uneven, that is, the distribution of users in different areas of a cell or a carrier may be different. Therefore, as for the switching control for a cell or a carrier level performed according to the related art, the wireless service of the cell or the carrier cannot be turned off due to user access to the cell or the carrier. However, some areas in the cell have no service user, and for these areas, the turned-on wireless service may cause waste of power of the base station (also called waste of energy or waste of resource).

As a second aspect, in the aspect of space, a same network parameter configuration is adopted for all areas, which have different service types in the cell or the carrier, resulting in poor energy saving effect.

In the related art, when the energy saving function is not turned on for the cell or the carrier, the network parameter configurations in all areas of one cell or one carrier, including a synchronization signal block (SSB) period, a power level, and a bandwidth part (BWP), etc. are the same. However, from a spatial perspective, the service types of different areas may be different in the coverage of one cell. If a same network parameter configuration is used for each area with different service types, resource waste will be caused.

As a third aspect, in the aspect of time, the number of accessed users in the cell or the carrier changes over time, but a fixed network parameter configuration may result in poor energy saving effect.

The number of users in each area of the cell is not unchanged. The number of users varies with people's daily activities and schedules. If the network parameter configuration in the area does not change at different times, for example, a same signal transmitting power is always used, which will result in waste of resource. In addition, the related art adopts the fixed network parameter configuration and cannot adapt to dynamic user requirements, and users cannot obtain the best quality of service (QoS) experience.

In summary, according to the solutions of the related art, for the energy saving method at the cell or carrier level, the problems of uneven distribution of users, different types of services, and the time-varying number of users in the cell cannot be solved, and the energy saving effect of the existing solution is relatively poor.

As shown in FIG. 1A, in schematic diagram of an energy saving scheme for cell level in the related art, a base station and three cells are provided. When there is user accessing in each of the three cells, the three cells are in ON state. That is, RU, DU and CU are all turned on. When there is no user accessing in a cell, the cell is turned off, and the cell is in OFF state, that is, the RU, DU, and CU of the cell are turned off.

Figure 1B:
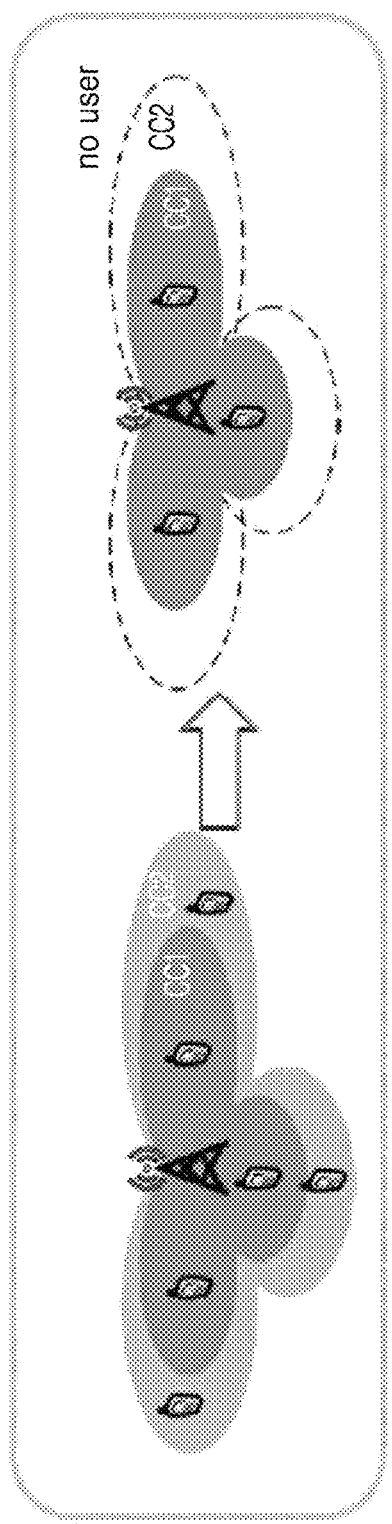
FIG. 1B illustrates a schematic diagram of an energy saving scheme for a carrier level in the related art.

As shown in FIG. 1B, in a schematic diagram of an energy saving scheme for carrier level in the related art, two carriers (that is, a carrier component (CC) 1 and a CC 2) are provided. When the number of users is relatively large, both carrier components are in ON state, to provide users with sufficient frequency resources. When the number of users is relatively small and there is no user accessing in some carriers, the carriers may be turned off, for example, CC2 is turned off. The method of turning off a carrier is actually to turn off the frequency resource of the base station, that is, the resource block (RB) corresponding to the carrier, to save the energy of the base station.

With respect to the above related art schemes, the following technical problems may be found:

When a cell or a carrier is turned off in an area, the users cannot use wireless service, or cannot obtain a good wireless QoS. In order to ensure the users' experience, in the base station energy saving schemes of the related art, the energy saving function of the base station is triggered only when there is no user access in one area. Therefore, in general, both the energy control based on cell and energy control based on carrier in the related art are based on large areas and coarseness, and the energy saving function is triggered only when there is no service user in a large area. Therefore, the energy saving granularity of traditional method is large but not fine enough, the energy saving effect is not good, the actual energy saving efficiency is low, and fine energy control cannot be implemented.

In addition, in the time dimension, most of the base stations are in a relatively idle state for a long time, and the number of accessed users is small. For example, 10% of the base stations, which are referred to as a first type, may carry 50% of the traffic, and the load of these base stations are heavy, 40% of the base stations, which are referred to as a second type, may carry 45% of the traffic, and another 50% of the base stations, which are referred to as a third type, only carry 5% of the traffic and is relatively idle, so the traffic within the coverage of each base station is unevenly distributed. However, in the related art, even if the number of accessed users of the base station is small, the base station must be always in ON state, which is another important cause of waste of energy.

Specifically, the problems of the related art mainly include the following three aspects:

As a first aspect, in the aspect of space, the traffic distribution in different areas of the cell or carrier is uneven, resulting in poor energy saving effect.

For example, if there are only a small number of accessed users in a certain area of the cell, then the cell cannot be turned off. Therefore, for other areas of the cell (areas without accessed user), the base station will still send broadcast signals, thus causing waste of energy. Similarly, for energy saving based on carrier, for example, if the carrier only serves for a very small number of users in a certain area, then the energy for other areas of this carrier is wasted.

Figure 1C:
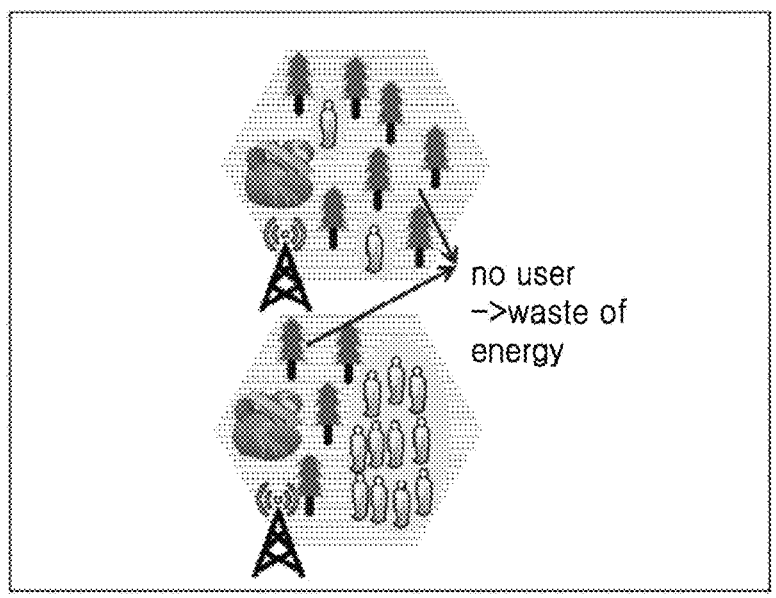
FIG. 1C illustrates a schematic diagram of waste of energy caused by local uneven user distribution in a cell in the related art.

As shown in FIG. 1C, in one cell, the users' distribution is uneven, that is, there are accessed users in some local areas, and there are not accessed users in some local areas. If the wireless service is always turned on for the areas without accessed user, the base station still may transmit broadcast signals, which may be waste of energy.

Therefore, in this scenario, the local uneven user distribution in one cell causes waste of energy.

As a second aspect, in the aspect of space, the same network parameter configuration is adopted for each area with different service types in the cell or carrier, resulting in poor energy saving effect.

Figure 1D:
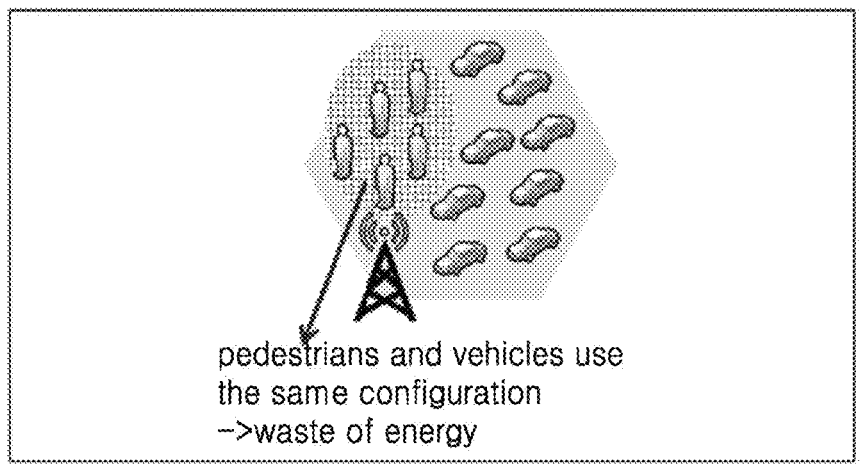
FIG. 1D illustrates a schematic diagram of waste of energy caused by using the same configuration for different service types in the related art.

As shown in FIG. 1D, in one cell, some areas are reserved for pedestrians (walking streets, open plazas, etc.), accessed users are pedestrian users (slowly moving users), and some areas are reserved for vehicle users (viaducts, highways, etc.), accessed users are vehicle users (fast moving users). These two types of users have different requirements for the network's synchronization signal period due to different moving speeds. Generally, users who move at high speeds have higher requirements for synchronization signals, and require a short-period SSB configuration, and users who move at low speeds have relatively low requirements for the synchronization signals, and a long-period SSB configuration can meet the requirements, but it is also possible to use the short-period SSB configuration. In order to satisfy all users, the network usually configures the network with a short-period SSB, meeting both the pedestrian users and the vehicle users at the same time. This is because the related art does not classify the service types in one cell, so the cell is usually configured according to the shortest SSB, that is, the cell cannot implement a differential configuration, that is, the configured parameters for the pedestrian users and the vehicle users are the same, they both use short-period SSBs, which means that the base stations frequently send SSB. For the pedestrian users, because their requirements for latency are low, long-term SSB can meet the needs of the pedestrian users, and the frequent sending of SSB signals by the base station causes waste of energy.

Therefore, in this scenario, an indiscriminate network configuration is used in a cell for areas of different service types, resulting in waste of energy.

As a third aspect, in the aspect of time, the number of accessed users in a cell or a carrier changes with time, but a fixed network parameter configuration may result in poor energy saving effect.

Figure 1E:
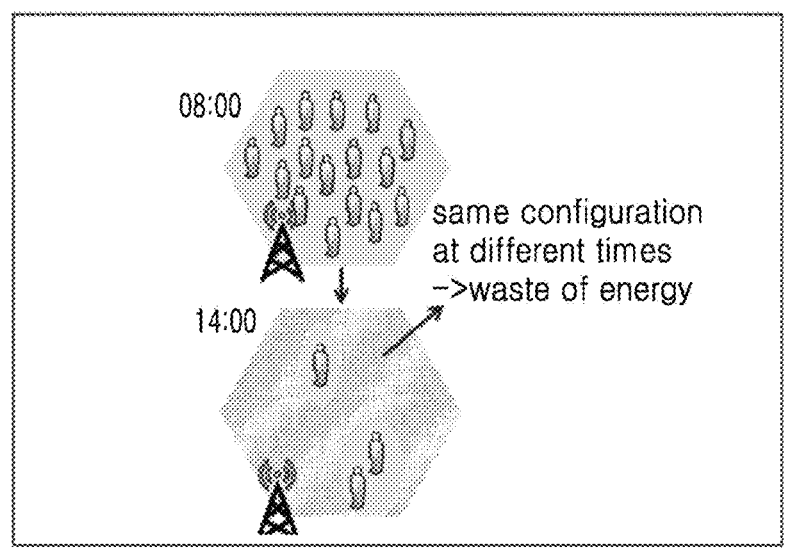
FIG. 1E illustrates a schematic diagram of waste of energy caused by the number of users changing over time in the related art.

As shown in FIG. 1E, the number of users in one cell is time-varying, but the network parameter configuration in the cell in the related art is constant, that is, the same network parameter configuration is used at different times. When the number of users is small, the base station signal transmitting power of the corresponding area may be reduced or turned off correspondingly, otherwise energy is wasted. For example, at a time 08:00, a certain cell has a large number of users, and the base station uses power p1 to cover a larger area. However, at a time 14:00, the number of users in this cell is greatly reduced. However, in the related art, the base station uses the same configuration, and the power is still p1, which causes waste of energy. If at 14:00, the base station may adaptively change the power to use the power p2, and p2<p1, then the energy saving purpose can be implemented to some extent. Therefore, adaptive network parameter configuration may implement energy saving effect.

Therefore, in this scenario, the same network parameter configuration is used at different times in a cell, resulting in waste of energy.

For the above technical problems, embodiments of the disclosure may relate to a smart energy saving mode for a base station with a beam cluster as a control unit in a 5G network. The base station of the 5G network may have a plurality of small beams. Embodiments of the disclosure may relate to collecting beam data corresponding to the beams of the base station, and clustering (also referred to as aggregating) small beams to form a beam cluster based on the service features of each beam, predicting a traffic of each beam cluster, configuring network parameters for each beam cluster based on the predicted traffic, and performing corresponding operations according to the configured network parameters.

The solution proposed by embodiments of the disclosure may enable the base stations to adapt to different scenarios varying with space and time, and then the base stations may more accurately configure beams covering different ranges in the cell in units of beam clusters, to adapt to the time-varying number of users, uneven distributed services and different service types, achieving high-precision energy saving purpose. Embodiments of the disclosure may perform smaller-scale and more precise area division on space in the cell coverage, and save more base station energy consumption by learning and predicting data and by implementing intelligent granularity control mode in time.

Figure 2:
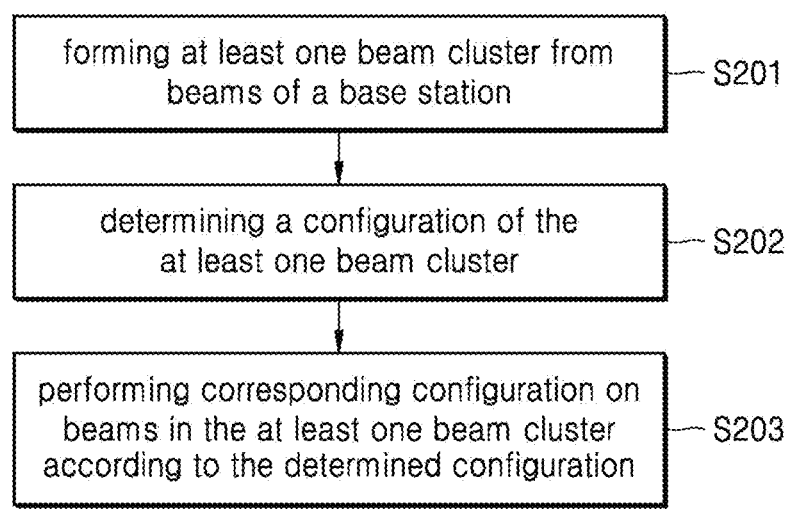
FIG. 2 illustrates a flowchart of a beam configuring method according to an exemplary embodiment of the disclosure.

FIG. 2 illustrates a flowchart of a beam configuring method, according to an exemplary embodiment of the disclosure.

Referring to FIG. 2, in operation S201, at least one beam cluster is formed from beams of a base station.

In a 5G system, a beamforming technology may be used in the frequency band above 6 GHz, which means that one cell will be collectively formed by a plurality of beams, and each beam has its own independent coverage space. Due to geographically heterogeneous environment, the uneven distribution of accessed users, and the time-varying characteristic of accessed users, the demand for wireless services within coverage of each beam also changes.

There may be a plurality of beams for a 5G base station, each beam may provide wireless service to users independently, and data about service users of the beams will be used to cluster the beam clusters. The service features of each beam may be firstly extracted from the database. The service features of the beams may also be referred to as features of the beams or beam features. The service features include service distribution in time and in space (for example, statistics of beam number, time and the number of accessed users), service type (for example, statistics of beam number and users' moving speeds, or, statistics of beam number and a QoS Class Identifier (QCI) of signals, or, statistics of beam number and an uplink/downlink data ratio, etc.), and volume of the service traffic (for example, statistics of beam number, and throughput, Resource Block (RB) usage rate, or number of accessed users or time, etc.), then the service features of these beams may be compared and beams with similar service features are clustered into one beam cluster. The number of beams in the beam cluster may be one or multiple. And the beams in one beam cluster may be adjacent or non-adjacent in space.

In exemplary embodiments of the disclosure, before the at least one beam cluster is formed from beams of a base station, beam data of beams of the base station is collected.

The base station or a server for energy saving performs beam data collection in real time, and stores the collected beam data in a database. Here, the beam data may at least include communication data. The communication data may include at least one of the following: user location information, current time information, service type information about a beam, service traffic information about a beam, service distribution information about a beam, synchronization signal period information about a beam, transmitting power information about a beam, signal quality information, beam number information. Here, the location information includes, but is not limited to, a geographical location. Taking the geographical location as an example, in addition to longitude and latitude information, the geographical location may be corresponding administrative area information, or a mapped index of a processed geographical location, or, the beam index id also corresponds to a small area. In exemplary embodiments of the disclosure, in forming the at least one beam cluster from beams of a base station, the at least one beam cluster may be formed from beams of a base station according to the beam data. In exemplary embodiments of the disclosure, in forming the at least one beam cluster from beams of a base station according to the beam data, beams with similar features may be clustered into the same beam cluster according to the beam data.

Specifically, the beam data may include wireless data from base stations or terminals, that is, conventional data in a communication system, which may also be referred to as communication data; these data belong to conventional wireless data and may be used as the most basic input. These basic wireless data include user location, time, service type of a beam, service distribution, service traffic of a beam, period of a synchronization signal of a beam, transmitting power, signal quality, beam number, etc. The measurement of service traffic (that is, the volume of services) may be the throughput of base station, the RB usage rate, the number of IP data packets, the number of accessed users, etc.; the service type may be classified according to the moving speed (for example, according to different levels of speed (30 km/h, 60 km/h, 120 km/h, etc.)), or according to the QCI (for example, video, voice, data, etc.), or according to the uplink/downlink data ratio (for example, Virtual Reality (VR)) services (uplink data is more than downlink data) and video watching services (downlink data is more than uplink data); or other classification methods.

In exemplary embodiments of the disclosure, in clustering the beams with similar features into the same beam cluster according to the beam data, service feature information about each beam may be firstly extracted from the communication data in the beam data. Herein, the service feature information includes at least one of service traffic information, service type information, and service distribution information. And then the at least one beam with similar features is clustered into one beam cluster according to the extracted service feature information. Specifically, at least one beam having feature similarity exceeding a first threshold may be clustered into one beam cluster.

Specifically, the service features of each beam may be extracted in historical data of each beam in the database (for example, data in some previous days, such as X days), and at least one of service traffic, service type, service distribution, etc. of each beam is obtained. Here, the service traffic refers to time sequence data, and the specific measurement indicator may be at least one of the throughput of base station, the RB usage rate, the amount of IP data packet, and the number of accessed users. The service type refers to the classification of the service. The service may be classified according to moving speed, or according to the QCI classification, or according to the uplink/downlink data ratio, or according to other classification methods. The service distribution refers to service distribution in space, that is, statistics between beam number (or geographical location information about beams) and at least one of the number of accessed users, the RB usage rate, the QCI, the users' moving speeds, and a channel quality, etc.

In exemplary embodiments of the disclosure, in clustering the at least one beam with similar features into one beam cluster according to the extracted service feature information, at least one beam with feature similarity exceeding a first threshold may be clustered into one beam cluster according to the extracted service feature information.

In exemplary embodiments of the disclosure, in clustering the beams with similar features into the same beam cluster according to the beam data, beams with similar features may be clustered into the same beam cluster based on an average displacement polymerization method according to the beam data. Because the clustering of beam clusters by using the average displacement aggregation method does not require prior knowledge, for example, there is no need to know the number of beams in the beam cluster in advance, the efficiency is high, the flexibility is high, and the computational complexity is low, and thus is applicable in an uneven traffic distribution scenario.

In exemplary embodiments of the disclosure, in clustering the beams with similar features into the same beam cluster based on the average displacement polymerization method according to the beam data, sample points corresponding to the beam data of each beam of the base station may be firstly acquired, then one sample point is selected randomly as center from all sample points, and all sample points within a range with the preset radius and centered on the center selected as above are found out, then an average displacement vector of displacement vectors of all sample points to the center within the preset radius range is calculated, then beams corresponding to all sample points in the preset radius range are clustered according to the average displacement vector, and as long as there are beams that are not clustered, sample points of all un-clustered beams are regarded as the all sample points, and go back to the step of selecting one sample point randomly from all sample points as the center. Here, the sample point represents a vector of feature quantized index values of a beam, including one or more of service type information, service traffic information, and time information. The radius refers to the distance value between the vectors, and the distance may be, but not limited to, Euclidean distance, Manhattan distance, Chebyshev distance, Mahalanobis distance, Hamming distance or related distance.

As an example, the specific steps for clustering the input samples may be as follows:

(A) randomly selecting one sample point as a center (center) from the input sample points (corresponding to the sample points corresponding to the beam data of the above each beam);

(B) finding out all sample points within a range of radius r from the center (the value of the parameter r may be determined according to domain values of all training samples), and marking the found out sample points as $c\_i$, wherein i represents an identification of the beam cluster currently to be created;

(C) calculating the displacement vectors of these sample points $c\_i$ to the center to obtain their average displacement vector shift;

(D) updating new center to center=center+shift, which is the sum of the center of step (A) and the displacement shift of step (C);

(E) repeating steps (B) (C) (D) until the average displacement vector shift is small enough, for example, less than a certain threshold ε, then going to step (F);

(F) comparing the new sample points $c\_i$ with old sample points $c\_(i-1)$, clustering the new sample points $c\_i$ and the old sample points $c\_(i-1)$ if they are close to each other, otherwise creating a new beam cluster i=i+1. The distance between the new sample points $c\_i$ and the old sample points $c\_(i-1)$ may be obtained by comparing the distance between the sample point cluster to which the new sample points $c\_i$ belong and the sample point cluster to which the old sample points $c\_(i-1)$ belong;

(G) repeating steps A-F until all sample points are visited.

Figure 3:
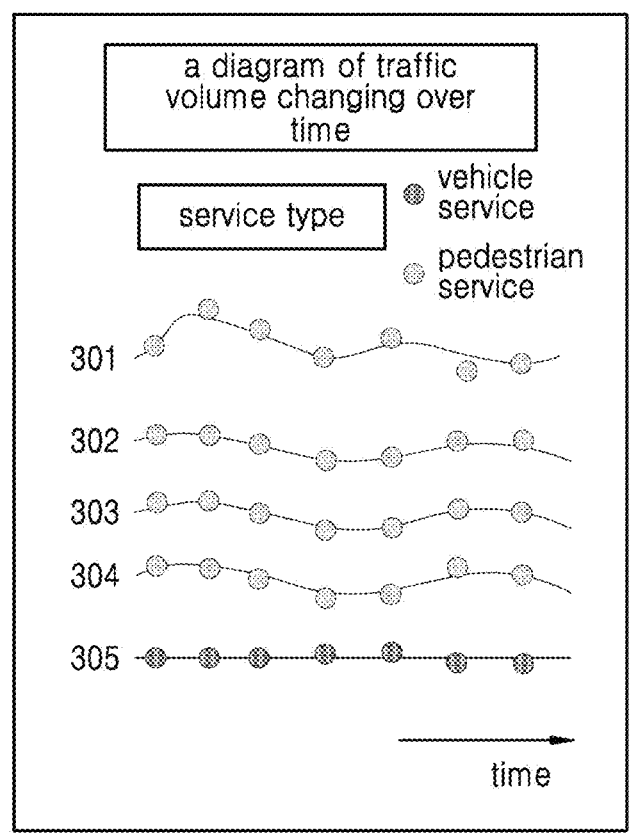
FIG. 3 illustrates a schematic diagram of service traffic according to an exemplary embodiment of the disclosure.

FIG. 3 illustrates a schematic diagram of the traffic of each beam of a base station changing with time according to an exemplary embodiment of the disclosure. Referring to FIG. 3, the main service users of beam 301 to beam 304 are the pedestrian users (that is, the service type is a pedestrian user service or a pedestrian service), and the main service users of beam 305 is the vehicle users (that is, the service type is a vehicle service). The service feature information (including at least one of service traffic information, service type information, and service distribution information) of each beam may be firstly extracted, and then beams with similar features may be clustered into one beam cluster according to the extracted service feature information. For example, the service type information may be extracted according to the service traffic in FIG. 3, and then beams, such as beam 301~beam 304, for serving pedestrian users are clustered into one beam cluster, and the beam, such as beam 305, for serving vehicle users is clustered into one beam cluster, by using the average clustering method.

Figure 4:
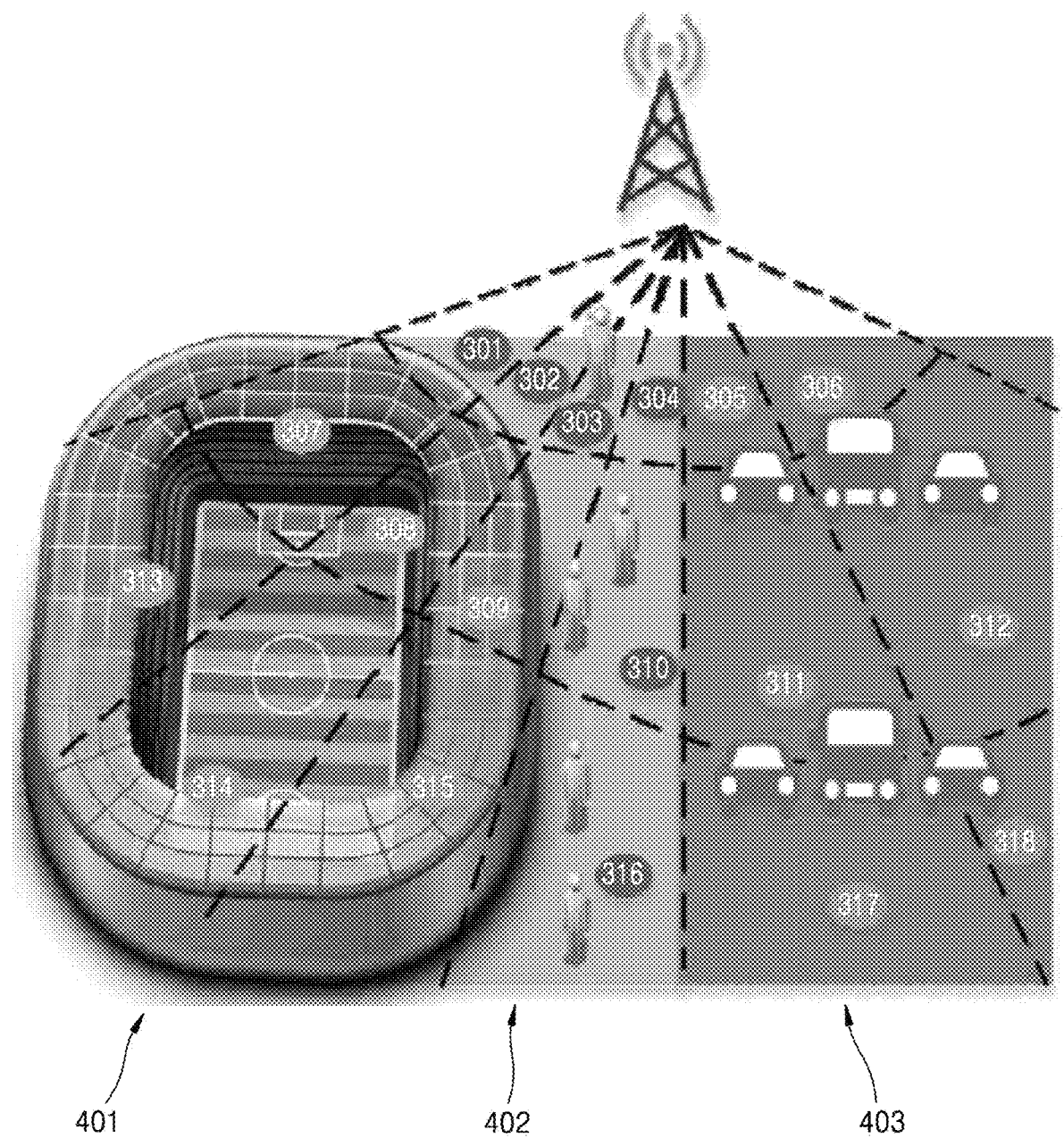
FIG. 4 illustrates an example of clustering results of beam clustering according to an exemplary embodiment of the disclosure.

FIG. 4 illustrates an example of clustering result of beam clustering according to an exemplary embodiment of the disclosure. As shown in FIG. 4, beams of the base station include beams 301 to 318 in FIG. 4. The 18 beams may be clustered into three types by using the clustering method proposed in the embodiments of the disclosure. For example, as shown in the embodiment illustrated in FIG. 4, the beams in a stadium are clustered into beam cluster 401 (including beams 307-309, and beams 313-315), beams outside the stadium are clustered into pedestrian beam cluster 402 (including beams 301-304, beam 310, and beam 316) and vehicle beam cluster 403 (including beams 305-306, beams 311-312, and beams 317-318).

In addition to the above-described average displacement method, another exemplary embodiment of the disclosure proposes that beam clusters may also be clustered by a service intensity heat map, and in forming at least one beam cluster from beams of the base station, the service intensity heat map of the base station may be firstly acquired. The service intensity heat map may reflect the service strength of each beam of the base station, and image recognition may be performed on the acquired service intensity heat map, and then at least one beam of the base station is clustered based on the color similarity in the service intensity heat map, that is, beams of similar colors in the service intensity heat map are clustered into one beam cluster. For example, at least one beam of an area in the service intensity heat map with a color similarity exceeding a second threshold is clustered into one beam cluster. Here, the service intensity heat map represents the service strength of an area by color, and the service strength is expressed as one or more of the following: the number of users, the amount of traffic, and the resource block (RB) usage rate.

In addition to the above method of the average displacement method and the service intensity heat map method, in an exemplary embodiment of the disclosure the beam clusters may also be clustered by the beam handover relationship corresponding to the base station. FIG. 5 shows a beam handover relationship of a base station (which may also be referred to as a beam handover table) according to an exemplary embodiment of the disclosure. In forming the at least one beam cluster from beams of the base station, handover correlation between the beams may be first calculated according to the beam handover relationship corresponding to the base station (as shown in FIG. 5), and then at least one beam of the base station is clustered into one beam cluster based on the handover correlation between the beams, for example, at least one beam with handover correlation exceeding a third threshold may be clustered into one beam cluster. Because users' frequently moving trajectories are between the frequently switched beams, there is strong correlation between such beams. Specifically, as shown in FIG. 5, text recognition for the beam handover table of the base station is firstly performed, so that frequently handover beams are identified, and then the frequently switched beams are clustered together, wherein, the beam handover table of the base station is correspondence relationship between a beam number and an adjacent beam number to be switched. The beam handover table records a record of user equipment handover from one beam to another.

The beam clusters are not limited to spatially adjacent beam areas, and may also be beam areas that are not spatially adjacent. If two beams are far apart but they have similar service features, they may also be clustered into one beam cluster. The number of beams in one beam cluster may be one or more.

Figure 6A:
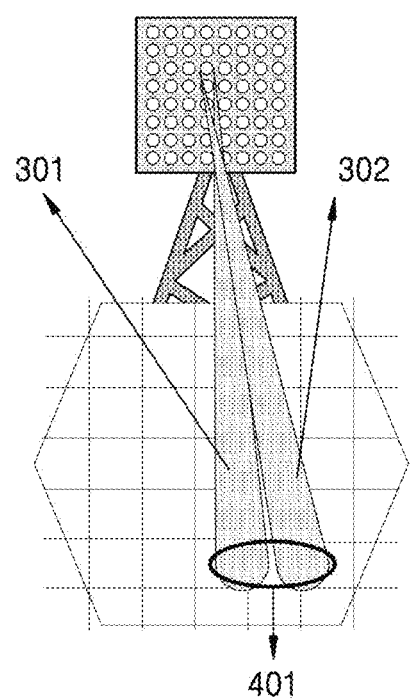
FIG. 6A illustrates a schematic diagram of example of a beam cluster.
Figure 6B:
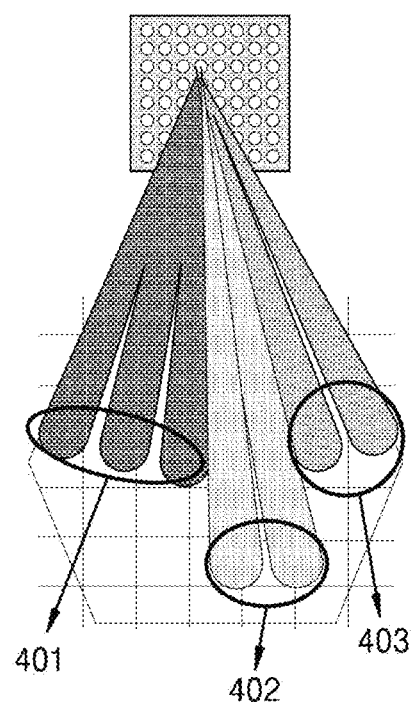
FIG. 6B illustrates a schematic diagram of example of beam clusters.

FIG. 6A illustrates a schematic diagram of an example in which two beams, for example beam 301 and 302, are aggregated into one beam cluster 401, and FIG. 6B illustrates a schematic diagram of an example in which a plurality of beams are aggregated into three beam clusters. As shown in FIG. 6B, beam cluster 401 contains three beams, beam cluster 402 contains two beams (which are beam 301 and beam 302, respectively), and beam cluster 403 contains two beams. FIG. 6B only illustrates beams included in the beam clusters are spatially adjacent beams, but it is also within the scope of the disclosure to form beam clusters that are not spatially adjacent. Beam clusters may be formed to reduce complexity and to facilitate fast calculation. Because the service features of beams in a beam cluster are highly similar, and unified control may be performed to avoid separate control for each beam, wherein, the beam cluster is a virtual concept, and the beams are not required to be spatially adjacent.

In an embodiment, in addition to the above-mentioned obtaining beam clusters by using the artificial intelligence clustering method, beam clusters may also be obtained by using a non-artificial intelligence method. For example, the Euclidean distance between vectors corresponding to the beam data may be compared to determine whether two beams are similar, so that similar beams are clustered into one beam cluster.

Referring back to FIG. 2, in step S202, a configuration of the at least one beam cluster is determined.

In exemplary embodiments of the disclosure, in determining the configuration of the at least one beam cluster, a traffic prediction value of each beam cluster is firstly calculated, and then a configuration of each beam cluster is determined based on the traffic prediction value of each beam cluster. Here, the configuration of the beam cluster includes at least one of the period of the synchronization signal SSB, a power level, a beam cluster bandwidth (for example, BWP), a direction of the beam cluster, and an ON/OFF state of the beam cluster.

In exemplary embodiments of the disclosure, in predicting the traffic (also referred to as the number of accessed users) for each beam cluster, the prediction may be performed based on the artificial intelligence method, or a prediction model may be configured and the traffic prediction value may be predicted based on the prediction model.

In configuring the prediction model, a variation pattern of the traffic in each beam cluster may be firstly analyzed based on the communication data (which may serve as the training data for configuring the prediction model) collected in real time or within a preset time period, and a prediction model of the traffic is configured for each beam cluster according to the variation pattern of the traffic in each beam cluster, and the prediction model may be configured offline according to the communication data in a preset time period, or the prediction model may be configured online according to the data collected in real time. Then the traffic prediction value of a beam cluster may be calculated by using the configured prediction model. Herein, the configured prediction model may be updated in real time based on variation in the training data.

The above-mentioned prediction model may be a prediction model based on time sequences, such as a multiple kernel Gaussian process (NGP), which may also be referred to as an NGP prediction model, or a multiple kernel Gaussian prediction model.

In exemplary embodiments of the disclosure, in calculating the traffic prediction value of each beam cluster, parameters of each time period kernel in the constructed prediction model may be firstly determined based on communication data in the beam data of each beam in the beam cluster, to obtain a prediction model based on time sequences, and then a traffic prediction value for each beam cluster at a predetermined time is determined using the prediction model based on time sequences, for example, a traffic prediction value at the current time, or a traffic prediction value at a certain time after a set time period, for example, a traffic prediction value at a time 1 minute later.

The multiple kernel Gaussian prediction model may include at least one time period kernel, and may include at least a fine-grained time period kernel, for example, a periodic kernel whose period granularity is on an hour basis.

Specifically, after a beam cluster is formed, the traffic in the beam cluster may be periodically predicted, and the period may be T1. The determination of the period T1 may be determined according to the service change rate of each area. For example, if the number of accessed users changes frequently in one area, then accordingly the number of accessed users in the area may be frequently predicted, and the traffic prediction period of the beam clusters in the area is short. In an embodiment, if the number of accessed users changes slowly in one area, then accordingly the prediction period may be extended, and accordingly the traffic prediction period of the beam clusters in the area is longer. The determination of the length of a specific period may be determined by the change rate of the number of accessed users. Periodic traffic prediction and configuration for beam clusters may adapt to dynamic service changes and implement accurate energy saving.

It may not be necessary to determine the configuration of each beam cluster. If there are abnormal beam clusters, there is no need to reconfigure such beam clusters. It is possible to determine whether the historical configuration of a beam cluster is normal by comparing the traffic prediction value of the beam cluster with the actual traffic value of the beam cluster. If abnormality is found, for example, a configured beam cluster cannot meet an actual traffic demand, and this configured beam cluster may be considered abnormal.

Each beam cluster may be independent of each other because the similarity between the beams has been considered in clustering the beam clusters, and only those with similar feature similarity may be aggregated into the same beam cluster. In other words, the beam similarity between different beam clusters is very low, and it may be considered that the difference between different beam clusters is large and independent of each other. The periodic traffic prediction of the beam cluster may be used because although the beams in one beam cluster have similar features, from the time dimension, the amount of traffic may vary greatly in each time period, so the corresponding parameters of this beam cluster may be periodically reconfigured, to implement a final energy saving effect. Of course, if there is no difference in service traffic between two time periods, the configuration of the beam cluster may remain unchanged.

Figure 7:
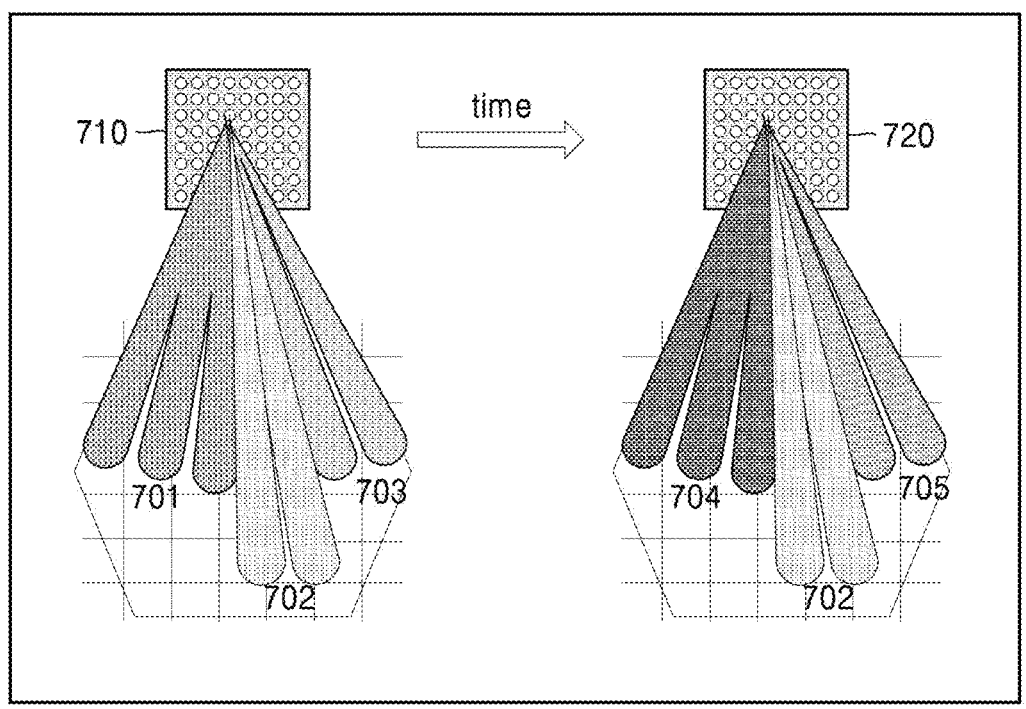
FIG. 7 illustrates a schematic diagram of configurations of beam clusters at different times according to an exemplary embodiment of the disclosure.

FIG. 7 shows a schematic diagram of configurations of beam clusters at different times according to an exemplary embodiment of the disclosure. As shown in FIG. 7, at time 710, configurations of three beam clusters are configuration 701, configuration 702, and configuration 703, respectively. At time 720, the configurations of the three beam clusters are configuration 704, configuration 702 (keep unchanged), and configuration 705, respectively, that is, the configurations of the beam clusters may be changed at different times or may remain unchanged. Because the beams in one beam cluster are extremely similar, they may use the same prediction model to predict traffic.

The configuration period of each beam cluster (being same as the traffic prediction period of the beam cluster) may be different, and the configuration period of each beam cluster may be variable. Assuming that the minimum configuration time unit is Tk, the actual configuration period of each beam cluster may be an integer multiple of Tk. Assuming that there are three beam clusters, the configuration periods of the three beam clusters are respectively n1*Tk, n2*Tk, n3*Tk, wherein n1, n2, n3 are integers greater than zero. If the beams in the beam cluster 401 mainly serves for the pedestrian users, the traffic prediction of the pedestrian user service may be performed for the beam cluster 401, and the configurations of the beam cluster 401 at different time periods is obtained. If the beams in the beam cluster 402 and the beam cluster 403 mainly serve for the vehicle users, and the beam cluster 402 covers a first vehicle area and the beam cluster 403 covers a second vehicle area, then the traffic prediction of the first vehicle area is performed for the beam cluster 402, and the configurations of the beam cluster 402 at different time periods are obtained, and the traffic prediction of the second vehicle area is performed for the beam cluster 403, the configurations of the beam cluster 403 in different time periods are obtained.

Taking the scene of FIG. 4 as an example, one area is a football field, corresponding to the beam cluster 401; one area is a pedestrian walkway, corresponding to the beam cluster 402; and one area is a car lane, corresponding to the beam cluster 403. There may be a large number of accessed users in the football field on weekends; there are people on pedestrian trails during the day and maybe no one at night;

and there may be vehicles on the car lane 24 hours a day, and the number of vehicles varies slowly. Then one possible configuration of Tk, n1, n2, n3 is that Tk=1 hour, n1=1, n2=1, n3=4, that is, the configuration period of beam cluster 401 and beam cluster 402 is 1 hour, and the configuration period of beam cluster 403 is 4 hours.

Figure 8A:
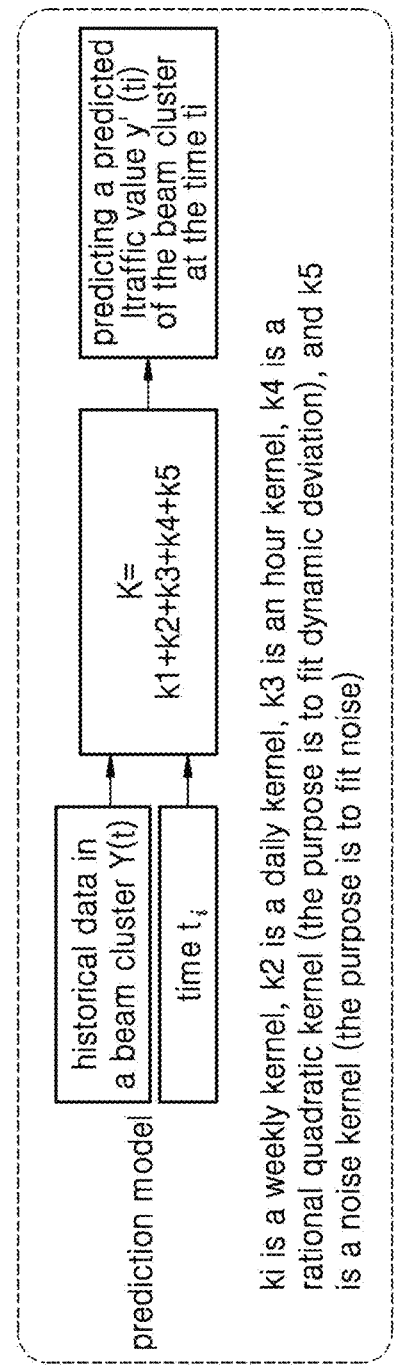
FIG. 8A illustrates an example of a multiple kernel Gaussian prediction model according to an exemplary embodiment of the disclosure.

Specifically, in the prediction model, NGP (multiple kernel Gaussian process) may be used as an example to predict traffic. This is because Gaussian process prediction may capture the uncertainty and nonlinearity of time sequences. FIG. 8A illustrates an example of a multiple kernel Gaussian prediction model, according to an exemplary embodiment of the disclosure. As shown in FIG. 8A, NGP supports multiple kernels (also known as time period kernels or Gaussian kernels), and NGP may capture multiple periodic characteristics in a data sequence, such as weekly periodic characteristics and daily periodic characteristics. In order to predict the traffic of a beam cluster more finely and better, a finer-grained time period kernel, that is, a Gaussian kernel with a shorter period, such as a kernel that captures hourly period characteristics, that is, a period kernel whose period granularity is based on hour, such as a 15 minutes/30 minutes/60 minutes period kernel may be defined. By adding a finer-grained time period kernel, the sensitivity of the prediction model to time may be improved, and the traffic change condition of the beam cluster may be more finely captured, so that the control on beams becomes more precise and flexible, and response to traffic changes becomes quicker.

For example, in an embodiment predicting procedure may be divided into the following three steps:

In a first step, the parameters of each kernel (k1, k2, k3, k4, k5) are calculated based on historical data Y(t) of the beam clusters in the database (beam data in the preset period of the beams within the beam cluster), wherein k1 is a weekly kernel (a kernel whose period granularity is based on week), which mainly captures the variation pattern of the input sequences in one week; k2 is a daily kernel (a kernel whose period granularity is based on day), which mainly captures the variation pattern of the input sequences in one day; k3 is an hour kernel (a kernel whose period granularity is based on hour), may be set to 15 minutes, or 30 minutes, or 60 minutes, which mainly capturing the variation pattern every quarter of an hour, or every half hour, or every 1 hour; k4 is a rational quadratic kernel for the purpose of fitting the dynamic deviation; and k5 is a noise kernel for the purpose of fitting noise.

In a second step, a final prediction model K is a sum of each kernel, that is, once the five kernels are solved, the prediction model K may be obtained.

In a third step, the time $t_i$ to be predicted is input, and a predicted traffic value $y'(t_i)$ of the beam cluster at the time $t_i$ is obtained.

Figure 8B:
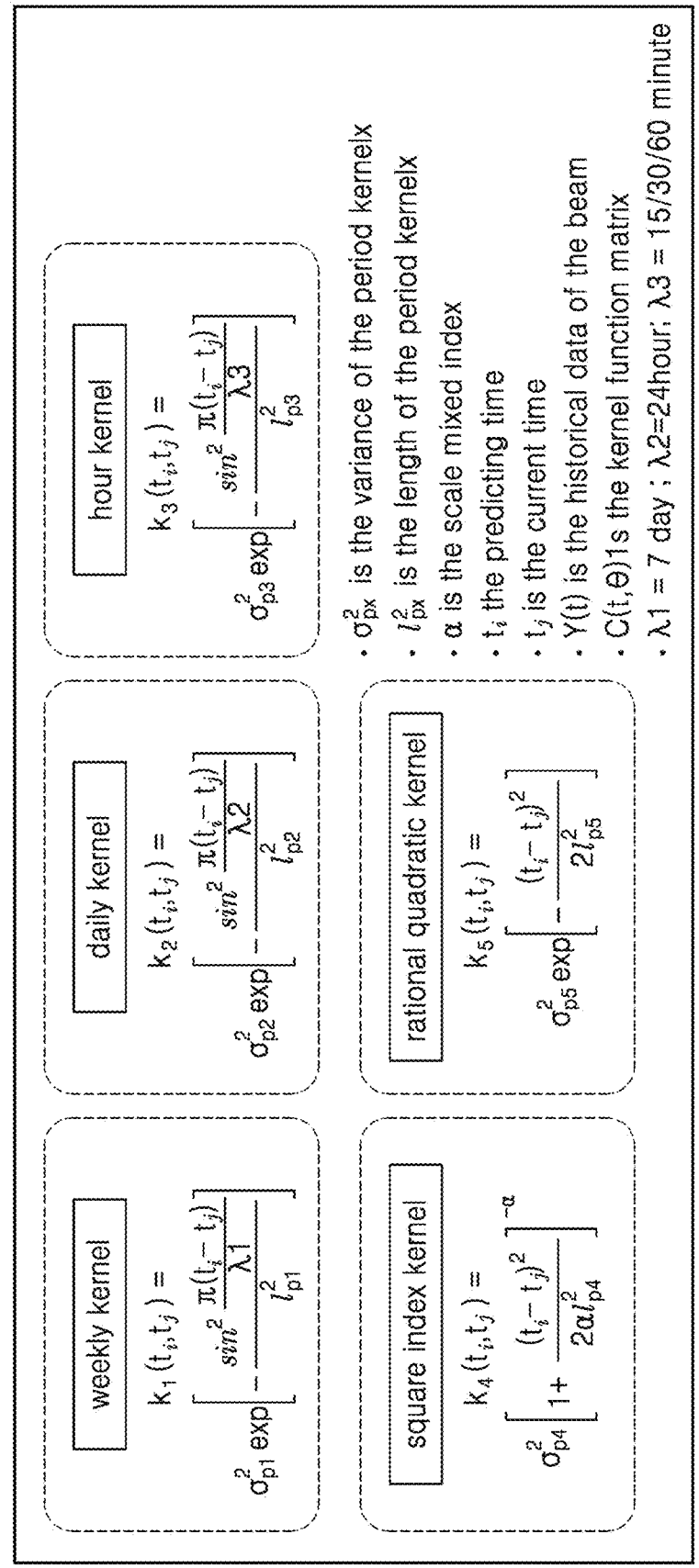
FIG. 8B illustrates an example structure of a Gaussian kernel according to an exemplary embodiment of the disclosure.

A structure of each Gaussian kernel may be, for example, a structure shown in FIG. 8B. FIG. 8B illustrates an example structure of a Gaussian kernel according to an exemplary embodiment of the disclosure.

For the five kernels k1, k2, k3, k4, k5 with a given structure shown in FIG. 8B, their parameter set may be shown in Equation 1 below:

$$\theta = [\sigma_{p1}^2, \sigma_{p2}^2, \sigma_{p3}^2, \sigma_{p4}^2, \sigma_{p5}^2, l_{p1}^2, l_{p2}^2, l_{p3}^2, l_{p4}^2, l_{p5}^2, \alpha]'$$ (Equation 1)

This set may be a set of parameters that need to be solved in the prediction model. This parameter set may be solved by the following cost function shown as Equation 2 below:

$$\operatorname*{argmin}_{\theta} l(\theta) = Y(t)^T C(t, \theta)^{-1} Y(t) + \log|C(t, \theta)|$$ (Equation 2)

When the set of parameters are solved, they may be brought into a formula shown as Equation 3 below:

$$K = k1 + k2 + k3 + k4 + k5$$ (Equation 3)

Then the K may be solved. Then, when a predicted time $t_i$ is given arbitrarily, the prediction value $y'(t_i)$ may be obtained.

It should be noted that the time sequences may be the number of accessed users in the time dimension, the load percentage of the base station, or the throughput of the cell, or the RB usage rate of the cell. These indexes are all positively correlated, and they may reflect the use condition of the network by users in one area, and facilitate the base station to make energy saving decisions.

In addition, time sequences predicting methods such as Long Short-Term Memory (LSTM) and Auto Regressive Model Moving-Average (ARMA) may also be used to predict the traffic within the beam clusters.

In exemplary embodiments of the disclosure, all beams in the same beam cluster use the same configuration; the configuration of beam cluster may change with time or remain constant, depending on whether the number of the beam cluster users changes. Exemplary embodiments of the disclosure are capable of coping with the number of users changing with time, which makes the network more adaptable in time.

Referring back to FIG. 2, in step S203, corresponding configuration is performed on beams in the at least one beam cluster according to the determined configuration.

In exemplary embodiments of the disclosure, different configuration parameters are configured for different beam clusters by clustering beams with different beam features into different beam clusters, thereby a smaller scale and more precise area division in space within the cell coverage is implemented, fine granularity control is implemented and more base station energy consumption is saved.

For the SSB period, in an example shown in FIG. 4, beam cluster 401 mainly serves for the access of the pedestrian users, and may be configured with a long period synchronization signal (SSB); for beam cluster 402 and beam cluster 403, the two beam clusters mainly serve for the access of the vehicle users, and may be configured with a short period SSB.

For the ON/OFF state and the direction of the beam cluster, the direction and the number of the beam clusters may be adjusted for the time-varying number of accessed users in a certain area. If the number of accessed users is small within a certain period of time, the number of the beam clusters in the area may be adjusted to be reduced.

For the power and the bandwidth of the beam cluster, if the number of accessed users in the beam cluster is small, the power and/or the bandwidth of the beam clusters may be reduced. Conversely, if the number of accessed users in the beam cluster is large, the power and/or the bandwidth of beam clusters may be increased.

In actual scenarios, the beam clusters may be not unchanged. Due to spatial changes or occurrence of certain events, the number of accessed users in an area may changes greatly. Such changes cause the previously formed beam clusters to be no longer accurate. In order to ensure the accuracy of beam cluster generation and improve robustness, the accuracy detection step may periodically compare the difference between the traffic prediction value and the traffic actual value of the beam cluster. The accuracy detection period (which may be referred to as T2) may be an integer multiple of the minimum configuration period Tk, that is, the step may be triggered every time T2, and the specific value of the period T2 may depend on the distribution of the number of accessed users of each beam cluster. The detection period of the accuracy detection is shorter if the number of accessed users of a certain beam cluster changes frequently. Otherwise, the detection period of the accuracy detection is longer if the number of accessed users of a certain beam cluster changes slowly.

In embodiments of the disclosure, the prediction deviation of the beam cluster may be calculated according to the traffic prediction value and the traffic actual value of the beam cluster, and the step may be performed periodically.

Whether to re-cluster the beam within a beam cluster and beams associated with the beam cluster may be determined based on the calculated prediction deviation. For example, it is determined whether the occurrences of a beam cluster whose prediction deviation is greater than a preset deviation exceeds a threshold of the number of times and if the result of the determination is YES, it indicates that re-clustering is needed, and the beams in the beam cluster and the beams associated with the beam cluster are re-clustered. Then, the configuration of the beam cluster obtained by the re-clustering is determined, and corresponding configuration is performed on beams in the at least one beam cluster according to the determined configuration.

This inaccurate determination on beam cluster formation may be an inaccurate prediction value at one time or may be consecutive inaccuracies at multiple times. Because the occasional inaccuracy may be only a small deviation, it is not enough to show that the original beam cluster clustering model (such as the above-mentioned average displacement aggregation method) has low performance, but consecutive occurrences of inaccuracy at multiple times sufficiently show that the original beam cluster clustering model has low performance, the current beam cluster is no longer accurate, and thus the beam clusters need to be re-formed. When it is detected that there are continuous significant prediction deviations for a certain beam cluster (for example, consecutive N occurrences of prediction deviations are greater than a set threshold, and N is an integer greater than zero), it is necessary to re-form the beam cluster. Here, the prediction deviation of the beam cluster refers to the difference between the traffic prediction value and the traffic actual value of the beam cluster. For example, the traffic prediction value at a historical time T and the traffic actual value at the time T may be used to calculate the prediction deviation.

Figure 10:
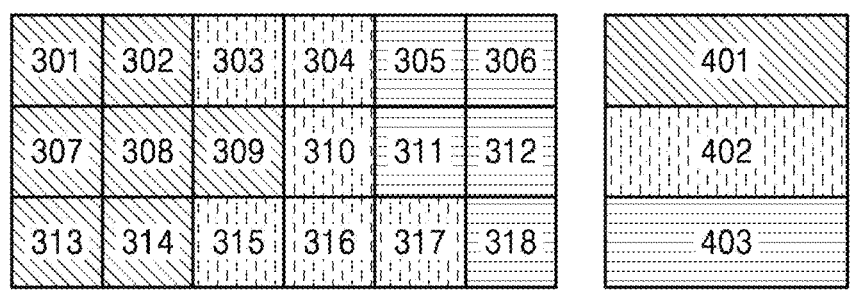
FIG. 10 illustrates a schematic diagram of beams used in regenerating a beam cluster according to an exemplary embodiment of the disclosure.

FIG. 10 illustrates a schematic diagram of beams used in regenerating a beam cluster according to an exemplary embodiment of the disclosure. In FIG. 10, when P=3 consecutive large deviations occur, it is considered that the formation of the beam cluster is inaccurate, and it is necessary to regenerate the beam cluster. If a large deviation is detected for beam cluster 402 at a time, the re-clustering of the beam cluster may not be performed at this time, and if a large deviation of three consecutive times is detected for beam cluster 401, the original beam cluster model is considered to have low performance and to be inaccurate, and beam cluster 401 need to be reformed. The beams used to regenerate the beam cluster include beams within other surrounding beam clusters, in addition to all beams from within the beam clusters. In FIG. 10, 18 beams and 3 beam clusters are illustrated. When it is detected that the prediction value of beam cluster 401 is not accurate, it is necessary to re-cluster beams {301, 302, 307, 308, 309, 313, 314} in beam cluster 401, and the beams {303, 304, 310, 315, 316} in the beam cluster 2 around beams {301, 302, 307, 308, 309, 313, 314}, wherein, the beams in beam cluster 402 may be considered to be the beams associated with beam cluster 401.

The beams associated with a beam cluster may be beams around the beam cluster, and may include a beam adjacent to the beam in the beam cluster, or a beam in a beam cluster where the beam adjacent to the beam in the beam cluster is located.

In practice, in some scenarios, there is often a situation in which the number of accessed users increases due to an emergency, such as a concert, a football game or a street performance. Therefore, it is necessary to periodically detect the occurrence of such an event, and to re-form the beam cluster based on similar historical events. The period for detecting such events may be T3. The collected beam data of the beams of the base station may further include data for predicting traffic demand change events, and may specifically include at least one of climate data, network application data (such as multimedia social platform data, network news media data, etc.), multimedia data (such as data from public cameras, etc.), transportation data, public utility data, holiday data, etc. Through functions such as keyword search or event detection, these data may be used to predict some unconventional events, such as a football game or a concert that will take place at a certain time in a certain place, which will lead to a surge in wireless services.

The method of detecting such events may use the base station or other servers to periodically collect data from public cameras or network media, and these events may be detected using artificial intelligence methods. When an emergency that may cause a sudden change in the number of accessed users is discovered, beam cluster may be re-formed for the beams in the event occurrence area to meet the user access requirement at the occurrence time of the event.

Specifically, beam data of beams of a base station is collected, wherein the beam data includes at least data for predicting traffic demand change events.

After the beams in the beam clusters are configured, the beam configuring method may further include: predicting traffic demand change events according to data for predicting traffic demand change events included in the beam data; when a traffic demand change event is predicted, re-clustering the beams in at least one beam cluster associated with the predicted traffic demand change events and beams associated with the at least one beam cluster; determining the configuration of the beam clusters obtained by the re-clustering; and performing corresponding configuration on beams in re-clustered beam clusters according to the determined configuration.

In exemplary embodiments of the disclosure, different configuration parameters are configured for different beam clusters by clustering beams with different beam features into different beam clusters, thereby a smaller scale and more precise area division in space within the cell coverage is implemented, fine granularity control is implemented and more base station energy consumption is saved. In addition, periodic traffic prediction and configuration for beam clusters may adapt to dynamic service changes and implement accurate energy saving.

FIGS. 9A-9E illustrate flowcharts of various methods 900A-900E, according to an exemplary embodiment of the disclosure. Within FIGS. 9A-9F, steps or operations with similar reference numerals may correspond to each other. For the sake of brevity, duplicate description of various steps is sometimes omitted.

Figure 9A:
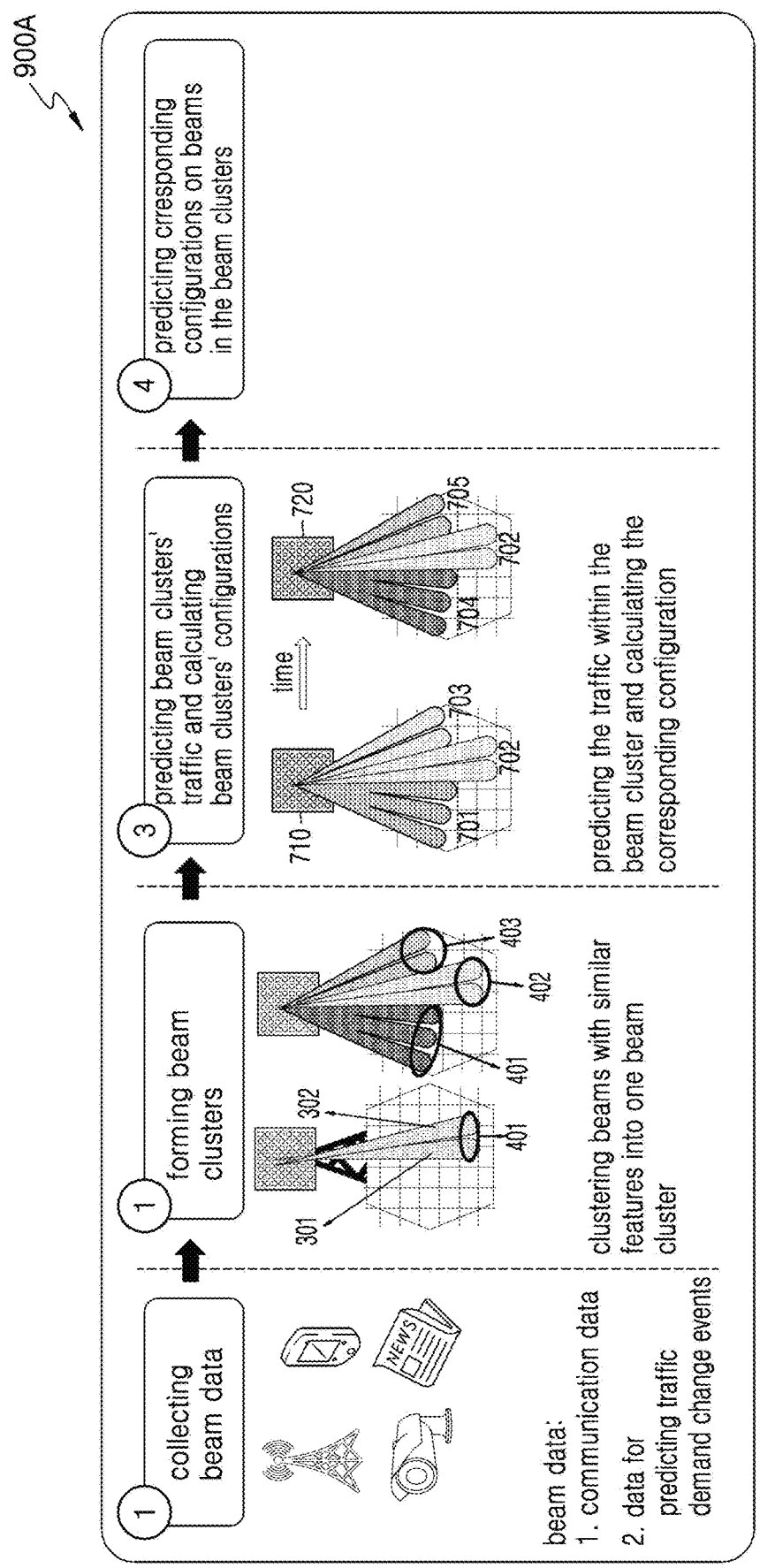
FIG. 9A illustrates a flowchart of a beam configuring method, according to an exemplary embodiment of the disclosure.

FIG. 9A illustrates a flowchart of a beam configuring method 900A, according to an exemplary embodiment of the disclosure.

In 1, beam data is collected.

The beam data includes communication data and data for predicting traffic demand change events.

In step 2, beam clusters are formed according to the beam data.

Beams with similar features are clustered into one beam cluster.

In step 3, traffic prediction and configuration calculations for beam cluster are performed.

Traffics in beam clusters are predicted and beam clusters' configurations are calculated.

In step 4, corresponding configuration is performed on beams in the beam clusters according to the determined configuration.

Figure 9B:
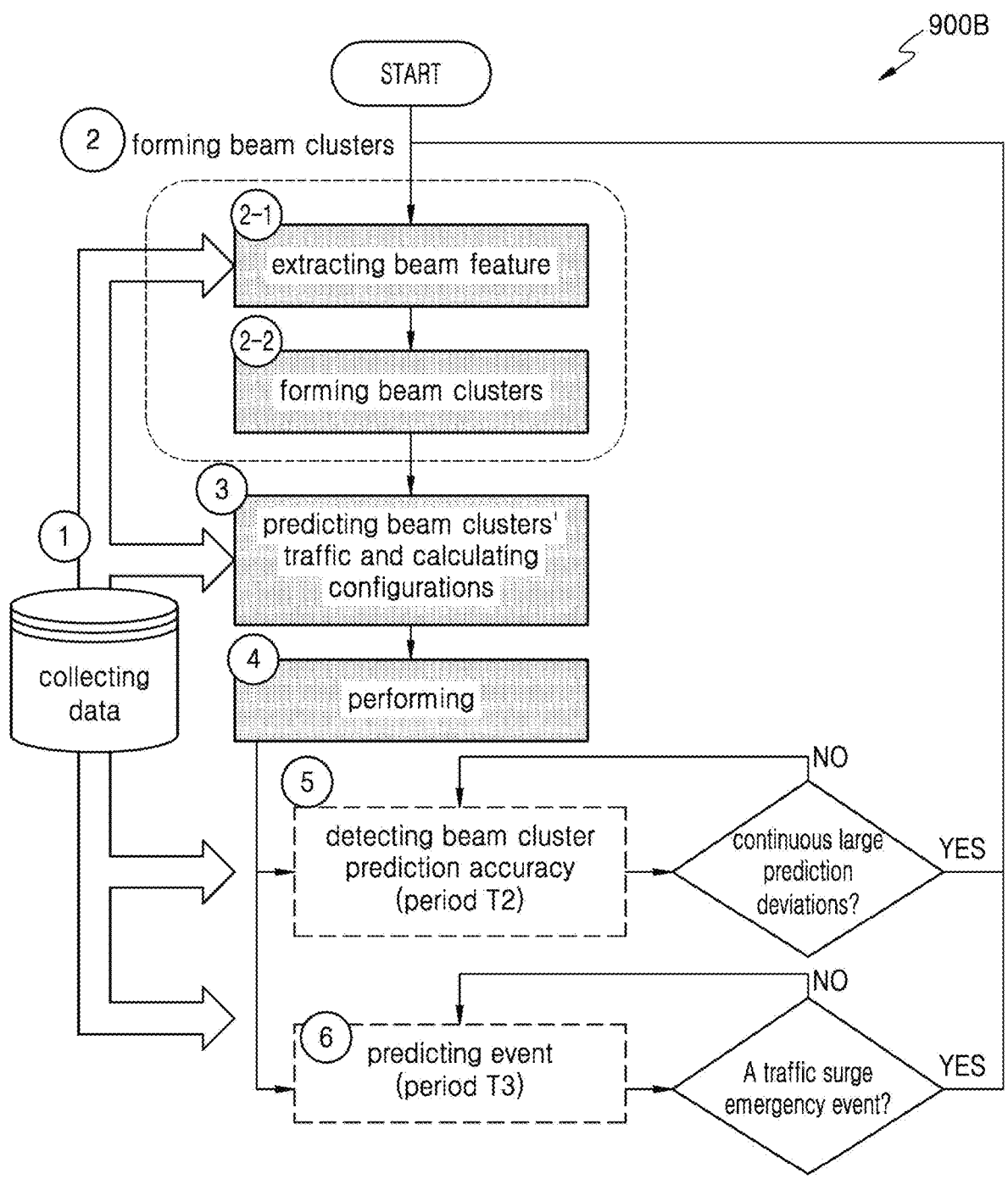
FIG. 9B illustrates a flowchart of a beam configuring method, according to an exemplary embodiment of the disclosure.

FIG. 9B illustrates another flowchart of a beam configuring method 900B, according to an exemplary embodiment of the disclosure.

As shown in FIG. 9B, step 2 further includes: step 2-1, beam feature extraction (also referred to as beam service feature extraction); and step 2-2, beam cluster formation, wherein, beam cluster formation may reduce a complexity of network control.

Step 3 may be performed periodically, and the performance period may be T1.

The performing of step 4 refers to performing corresponding configuration on the beams in a beam cluster, thus it can self-adapt to dynamic service changes and accurately implement energy saving of the base station.

In addition, in an embodiment such as the example illustrated in FIG. 9B, the beam configuring method 900B may further include step 5 and step 6.

In step 5, beam cluster prediction accuracy detection is performed, and the step 5 may be performed periodically. The period may be T2. If there are continuous large prediction deviations, the process may jump to step 2-1. Otherwise, step 5 is performed periodically.

In step 6, traffic demand change event prediction is performed, and the step 6 may be performed periodically. The period may be T3. If there is a traffic surge emergency event, the process jumps to step 2-1. Otherwise, the process continues to perform step 6 periodically.

The above periods T1, T2, and T3 may be same or different.

Steps 5 and 6 may improve the robustness of the beam configuration method proposed by the disclosure, to allow the beam clusters to adapt to changes in the environment.

Figure 9C:
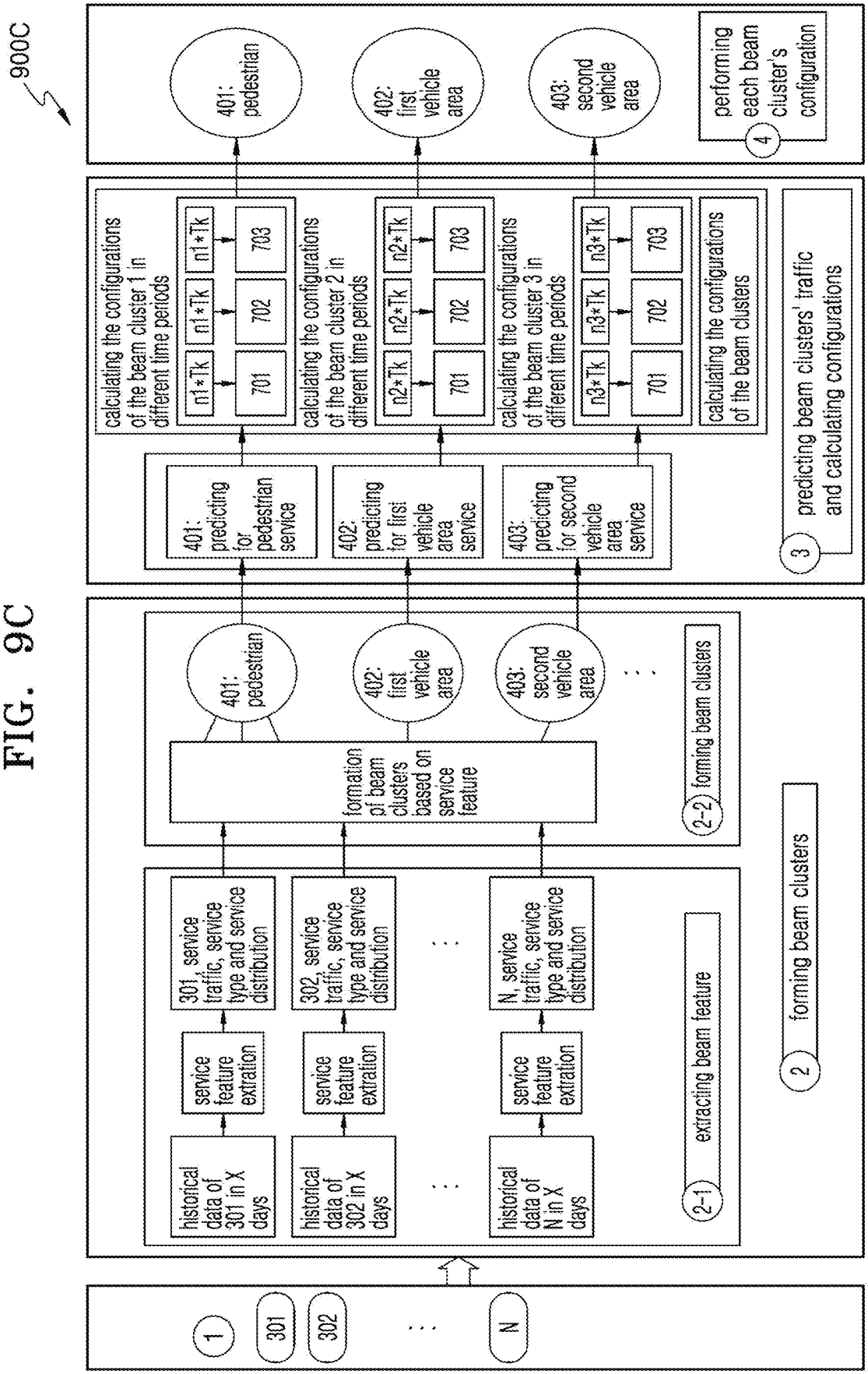
FIG. 9C illustrates a flowchart of a beam configuring method, according to an exemplary embodiment of the disclosure.

FIG. 9C illustrates another flowchart of a beam configuration method 900C, according to an exemplary embodiment of the disclosure.

In step 1, beam data is collected, wherein, the beams of a base station include beam 301, beam 302, . . . , and beam N.

In step 2-1, service features of each beam are extracted according to historical data of each beam (such as historical data in X days), wherein, the service features of a beam include at least one of service traffic, service type, and service distribution.

In step 2-2, beam clusters are formed based on the extracted service features of each beam, for example, beam cluster 401 (the main service users are pedestrian users), beam cluster 402 (the main service users are vehicle users, and first vehicle area is covered), and beam cluster 403 (the main service users are the vehicle users, and second vehicle area is covered) are obtained.

In 3, traffic prediction is performed respectively for each beam cluster, for example, pedestrian service prediction is performed for beam cluster 401, first vehicle area service prediction is performed for beam cluster 402, and vehicle area 3 service prediction is performed for beam cluster 403. According to the predicted traffic, a configuration of each beam cluster is calculated, and the configuration of each beam cluster in different time periods are obtained. As shown in FIG. 9C, the configuration period of each beam cluster may be different, for example, the configuration period of beam cluster 401 is n1*Tk, the configuration period of beam cluster 402 is n2*Tk, and the configuration period of beam cluster 403 is n3*Tk. The configurations of each beam cluster may be different at the same time, and the configurations of a same beam cluster may be different at different times.

In step 4, the configuration of each beam cluster is performed. For example, a corresponding configuration for pedestrian service is performed for beam cluster 401, a corresponding configuration for vehicle service of first vehicle area is performed for beam cluster 402, and a corresponding configuration for vehicle service of second vehicle area is performed for beam cluster 403.

Figure 9D:
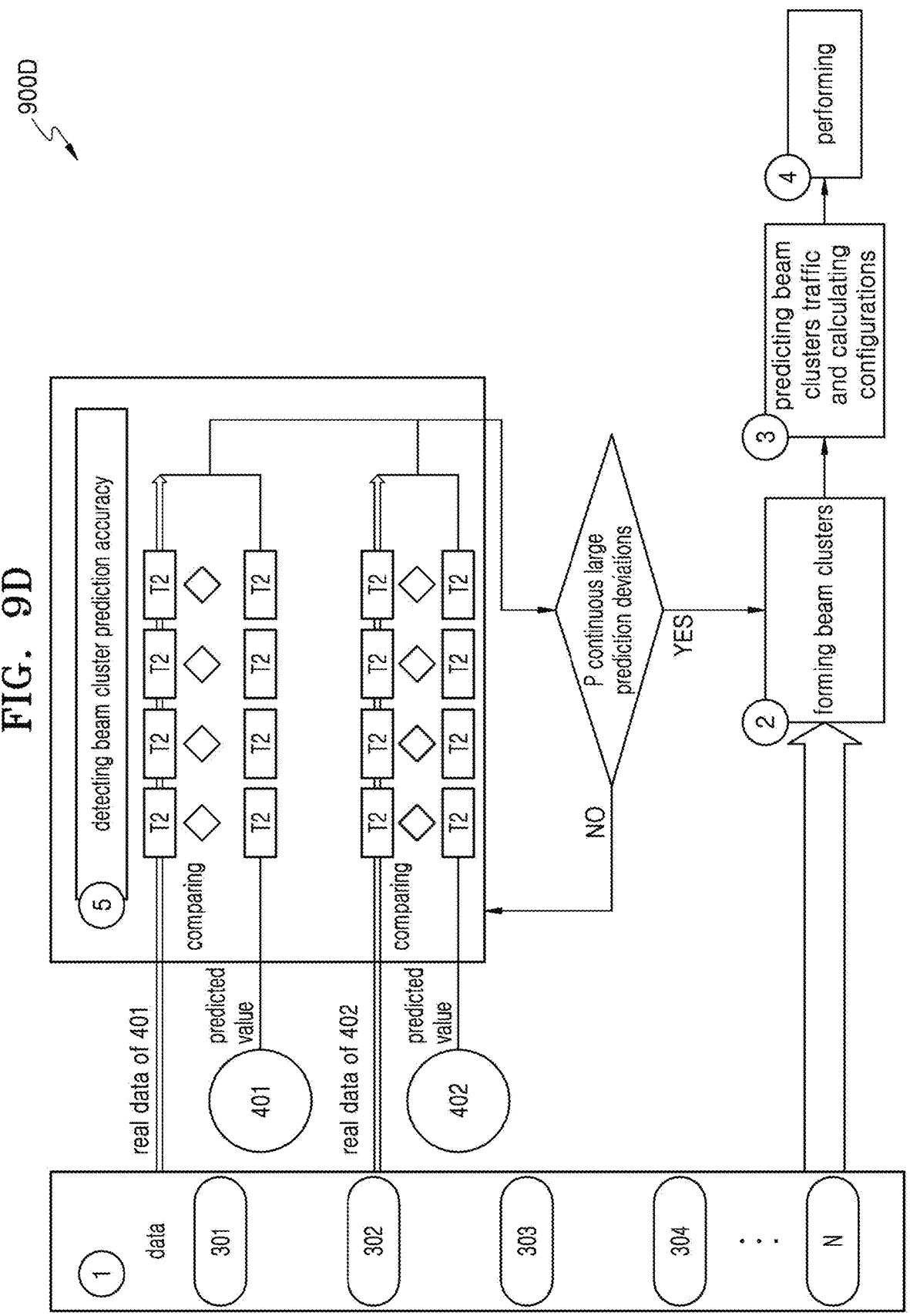
FIG. 9D illustrates a flowchart of a beam configuring method, according to an exemplary embodiment of the disclosure.

FIG. 9D illustrates a flowchart of a beam cluster prediction accuracy detecting method 900D, according to an exemplary embodiment of the disclosure.

According to the period T2, the beam cluster prediction accuracy is detected. According to the beam data of each beam collected in step 1, the real traffic data of each beam cluster may be obtained, and the predicted traffic data of the beam cluster may be obtained by step 3, and the real data (real traffic data) and the predicted traffic data are compared to determine whether there are P consecutive large prediction deviations, and P may be a preset threshold of the number of times. If the result of determination is YES, the beam cluster and its surrounding beams are re-clustered, and the process jumps to the step 2. If the result of determination is NO, re-clustering is not performed, and the accuracy detection is continuously performed periodically. For example, if beam cluster 401 has a large deviation in three consecutive periods T2, and P is 3, it is determined that the beams in beam cluster 401 and its surrounding beams need to be re-clustered. While if beam cluster 402 only has a large deviation in one period, it is determined that the beams in beam cluster 402 and its surrounding beams do not need to be re-clustered.

Figure 9E:
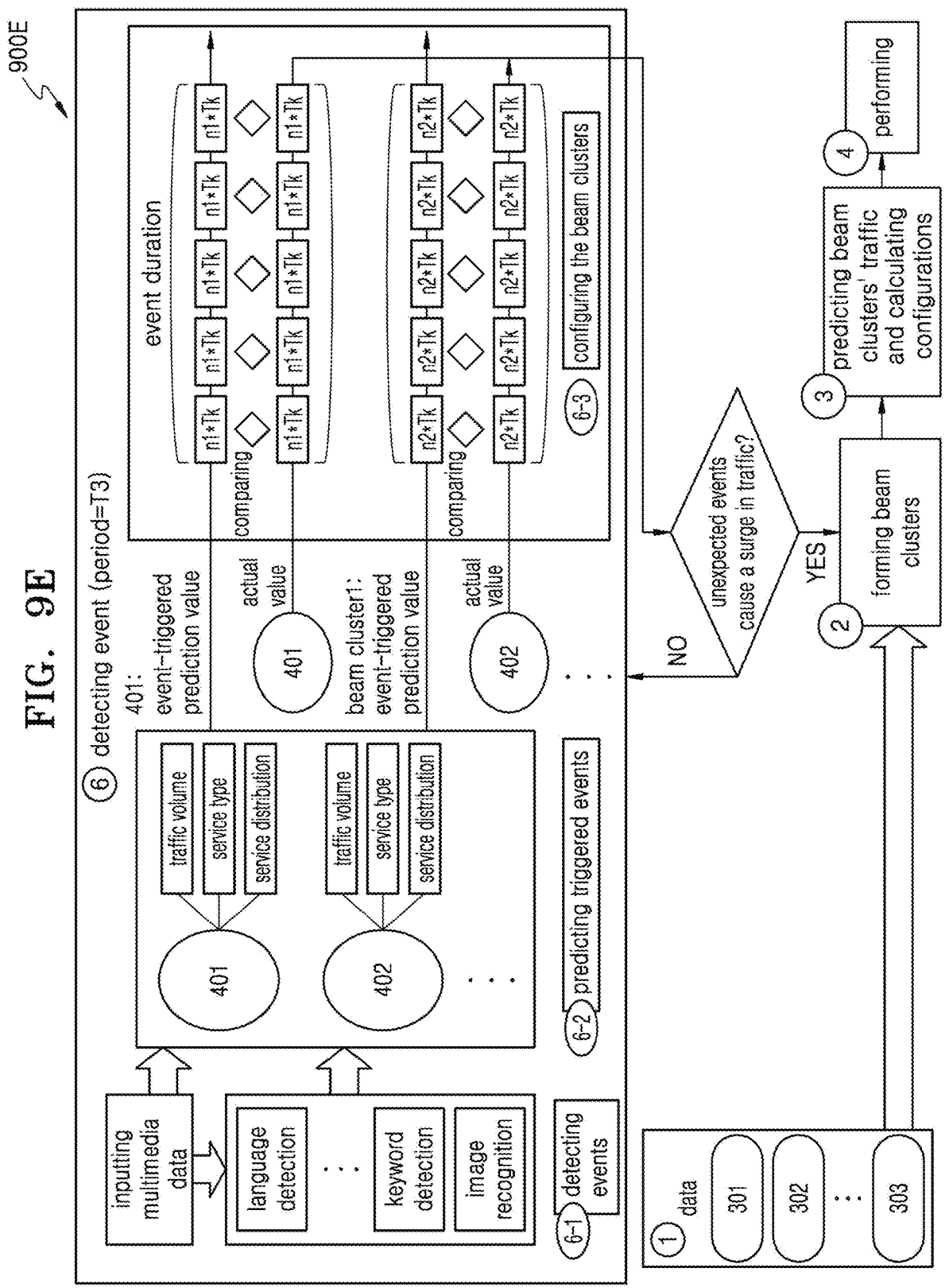
FIG. 9E illustrates a flowchart of a beam configuring method, according to an exemplary embodiment of the disclosure.

FIG. 9E illustrates a flowchart of a traffic demand change event detecting method 900E, according to an exemplary embodiment of the disclosure.

The traffic demand change event detecting method may also be referred to as a traffic demand change event predicting method, and may also be referred to as an emergency event detecting method or an emergency event predicting method.

In actual scenarios, there are often unconventional or non-periodic events that may lead to a surge in the number of users, such as concerts, football matches, large-scale brand exhibitions or festival performances. These events may be detected by artificial intelligence methods. From the data for predicting traffic demand change events in the beam data, for example, network news, public camera information, or mobile application software information, where and when events will happen is identified by using artificial intelligence methods (language detection, keyword detection, image recognition, etc.).

In step 6-1, in performing the traffic demand change event detection, whether a traffic demand change event exists, such as an emergency event of traffic surge is detected by using language detection, keyword detection, image recognition, etc., according to the data for predicting traffic demand change events in the beam data. An emergency event may be detected by step 6-1, and the start and end time points of this event may also be detected.

In step 6-2, when it is detected that there is a traffic demand change event, the traffic of this event is predicted according to the communication data in the beam cluster, which may also be referred to as event-triggered prediction.

According to the communication data in the beam data of each beam in the beam clusters, the service features of each beam cluster including the amount of service, the service type, the service distribution, etc. are extracted. The traffic of the event is predicted according to the service features of each beam cluster, and may be referred to as an event trigger prediction value.

In step 6-3, for each beam cluster, the event trigger prediction value is compared with the actual traffic value of the beam cluster (which may also be referred to as an actual value). When there is a prediction deviation, it is confirmed that an unexpected event occurs to cause a surge in traffic. At this time, beam aggregation can be performed again to obtain a beam cluster.

When the difference between the event trigger prediction value and the actual traffic value is greater than the set threshold occurs more than a set number of times, it is considered that a prediction deviation exists. That is to say, the situation that the difference between the event trigger prediction value and the actual traffic value is greater than the set threshold may occur once or may occur multiple times consecutively.

For example, for the services of beam cluster 401 and beam cluster 402, the difference between the event trigger prediction value and the actual traffic value of beam cluster 401 and beam cluster 402 are compared, and if they have a prediction deviation within their respective beam configuration period, it shows that a burst event occurs and the beam clusters may be regenerated, that is, steps 1, 2, 3 and 4 are repeated.

It should be noted that, in general conditions, the surge in traffic starts earlier than the exact time in the event detecting method. Especially for large-scale sport events and activities, for example, for a game starting at 19:00, users may arrive at the scene early.

FIG. 9F illustrates a flowchart of a beam configuring method 900F according to an exemplary embodiment of the disclosure.

Referring to FIG. 9F, in step S901, at least one beam cluster is formed from beams of a base station.

In exemplary embodiments of the disclosure, before the at least one beam cluster is formed from beams of a base station, beam data of the base station is collected. Here, the beam data may at least include communication data. The above beam data has been described above in the description about FIG. 2 and will not be described again herein.

In exemplary embodiments of the disclosure, in clustering the beams with similar features into one beam cluster according to the beam data, service feature information about each beam may be firstly extracted from the communication data in the beam data.

In exemplary embodiments of the disclosure, in clustering the beams with similar features into one beam cluster according to the extracted service feature information, at least one beam with feature similarity exceeding a first threshold may be clustered into one beam cluster according to the extracted service feature information.

In exemplary embodiments of the disclosure, in clustering the beams with similar features into one beam cluster according to the beam data, beams with similar features may be clustered into the same one beam cluster based on an average displacement polymerization method according to the beam data.

In step S902, a configuration of the at least one beam cluster is determined.

In exemplary embodiments of the disclosure, in determining the configuration of the at least one beam cluster, a traffic prediction value of each beam cluster is firstly calculated, and then the configuration of each beam cluster is determined based on the traffic prediction value of each beam cluster. The configuration of the above beam clusters has been described above in the description about FIG. 2, and details are not described again here.

In step S903, corresponding configuration is performed on beams in the at least one beam cluster according to the determined configuration according to the determined configuration.

In step S904, a prediction deviation of each beam cluster is calculated according to the traffic prediction value and the traffic actual value of the beam cluster.

In step S905, it is determined whether there are consecutive occurrences that a prediction deviation of a beam cluster is greater than a preset deviation and the number of the consecutive occurrences exceeds a threshold number of times. If the determination result is YES, step S906 is performed, otherwise step S905 is continued.

In step S906, if the times of consecutive occurrences of the beam cluster with prediction deviation greater than the preset deviation exceed the threshold number of times, the beams in the beam cluster and the beams associated with the beam cluster are re-clustered, wherein, beams associated with the beam cluster may be beams around the beam cluster, and may include beams adjacent to a beam in the beam cluster, or beams in a beam cluster in which a beam is adjacent to the beams in the beam cluster.

In step S907, the at least one beam cluster in step S902 is updated to the re-clustered beam cluster, and then the process goes back to step S902, so that the beams in the re-clustered beam clusters are reconfigured.

In step S908, a traffic demand change event is predicted according to data for predicting a traffic demand change event included in the beam data. Here, the beam data may also include the data for predicting traffic demand change events.

In exemplary embodiments of the disclosure, the data for predicting the traffic demand change event may include at least one of climate data, network application data, multimedia data, transportation data, public utility data, and holiday data. The data for predicting the traffic demand change event may be collected periodically or in real time, or may be collected aperiodically.

In step S909, when the traffic demand change event is predicted, the beam cluster associated with the predicted traffic demand change event and associated beams are re-clustered.

In step S910, the at least one beam cluster in step S902 is updated to the re-clustered beam cluster, and then the process goes back to step S902, so that the beams in the re-clustered beam clusters are reconfigured.

In exemplary embodiments of the disclosure, for an uneven service distribution and a time-varying service distribution in a 5G cell, a cell-customized variable configuration is implemented by clustering beams and predicting traffic, thereby implementing more accurate energy control granularity to save more 5G base station energy consumption, and about 50% of the average total energy consumption of the base station can be saved.

Figure 11:
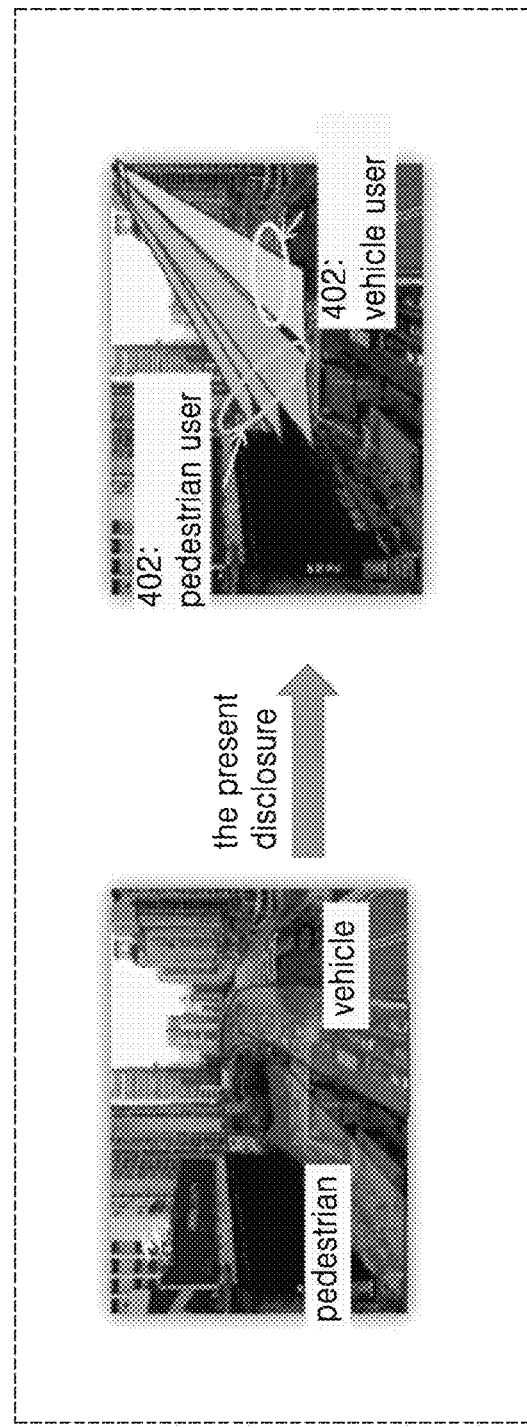
FIG. 11 illustrates an example of forming beam clusters for a business district's service type.

FIG. 11 illustrates an example of forming different beam clusters for different service types. As shown in FIG. 11, for a certain street model, one side is for pedestrians and the other side is for motor vehicles, and beams covering the pedestrian users may be clustered into one beam cluster with a long-period synchronization signal configured, and beams covering the vehicle users are clustered into one beam cluster with a short-period synchronization signal configured.

According to an embodiment consistent with FIG. 11, specific steps for forming a beam cluster are as follows:

In a first step, wireless data (corresponding to the above-mentioned communication data) in vicinity of a business district is collected, and basic wireless data includes user location, time, beam service type, the number of beam traffic services, beam synchronization signal period, and transmitting power, signal quality, beam number, etc., wherein, the measurement index of the amount of services may be the base station's throughput, the RB usage rate, the number of accessed users, etc., and the service type may be classified according to the moving speed (classification of different levels of speed 30 km/h, 60 km/h, 120 km/h etc.), or the QCI, the uplink/downlink data ratio.

In a second step, an average displacement method is used to compare the traffic features in each beam, the beams of the pedestrian area with similar features are clustered into beam cluster 401, and the beams of the vehicle areas with similar features are clustered into beam cluster 402.

In a third step, traffic prediction is performed for each beam cluster, and a configuration of each beam cluster is calculated. The pedestrian beam cluster 401 uses a long period synchronization signal, and the vehicle beam cluster 402 uses a short period synchronization signal.

In a fourth step, the configuration in the third step is performed.

Figure 12:
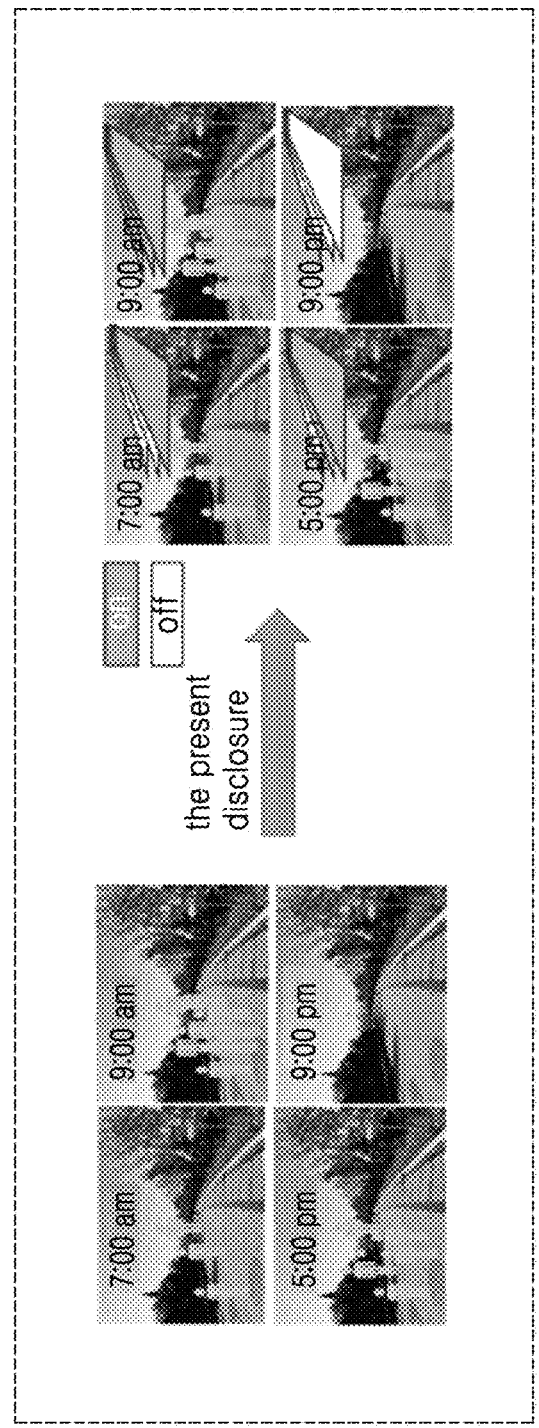
FIG. 12 illustrates an example of forming beam clusters for a time-varying number of accessed users in a certain area.

FIG. 12 illustrates an example of forming a beam cluster for a time-varying number of accessed users in a certain area.

As shown in FIG. 12, for the time-varying number of accessed users in a certain area (for example, a park area), if the number of accessed users is small within a certain period of time, the direction of the beam may be adjusted and the number of beams may be reduced.

According to an embodiment consistent with FIG. 12, specific steps for forming a beam cluster are:

In a first step, wireless data in vicinity of a park is collected, and basic wireless data includes user location, time, beam service type, the number of beam traffic services, beam synchronization signal period, and transmitting power, signal quality, beam number, etc., wherein, the measurement index of the amount of services may be the base station's throughput, the RB usage rate, the number of accessed users, etc., and the service type may be classified according to the moving speed (classification of different levels of speed 30 km/h, 60 km/h, 120 km/h etc.), or the QCI, the uplink/downlink data ratio.

In a second step, the traffic features within each beam is compared by using an image recognition method of GPS of the map. For example, for beams in different areas, if they have same traffic features in one day, that is, with a traffic density of 0.3 at 7:00 am, 0.8 at 9:00 am, 0.5 at 5:00 pm, and 0:00 at 9:00 pm, they will be clustered into one beam cluster.

In a third step, the number of accessed users is predicted within this beam cluster, and the corresponding configuration is calculated. For example, the traffic density is 0.3 at 7:00 am, then the direction, the power, and the ON/OFF states of the beam cluster are adjusted to turn on 30% of the beams to cover this area; the traffic density is 0.8 at 9:00 am, then the direction, the power, and the ON/OFF states of the beam cluster are adjusted to turn on 100% of the beams to cover this area; the traffic density is 0.5 at 5:00 pm, then the direction, the power, and the ON/OFF states of the beam cluster are adjusted to turn on 60% of the beams to cover this area; and at 9:00 pm, all beams are turned off.

In a fourth step, the configuration in the third step is performed.

Figure 13:
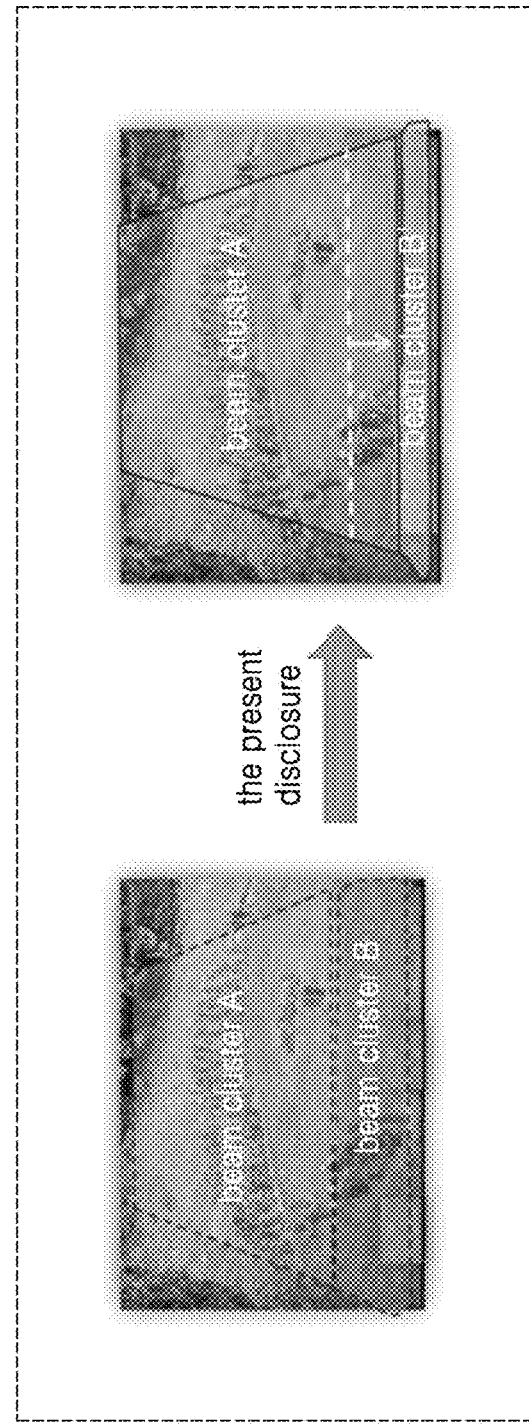
FIG. 13 illustrates an example of beam clusters adaptively change in a scene in which the user distribution is uneven.

FIG. 13 illustrates an example of beam cluster adaptive variation in a scene in which the user is unevenly distributed, and the shapes of the beam clusters vary according to the change in the RB usage rate.

As shown in FIG. 13, in a scenario where users are unevenly distributed, for example, the amount of users in beam cluster A and beam cluster B changes, the coordination between the beam clusters can be implemented by re-clustering the beam clusters.

According to an embodiment consistent with FIG. 13, specific steps for forming a beam cluster are:

In a first step, wireless data in a square is collected, and basic wireless data includes user location, time, beam service type, the number of beam traffic services, beam synchronization signal period, and transmitting power, signal quality, beam number, etc.

In a second step, traffic features in each beam are compared by a method of identifying adjacent beam handover tables in text, and all beams are clustered into beam cluster A and beam cluster B, respectively.

In a third step, load prediction is performed for each beam cluster, and a configuration of each beam cluster is calculated.

In a fourth step, the configuration in the third step is performed.

In a fifth step, as the time changes, the user density also changes. After consecutive occurrences of errors, it is necessary to readjust the formation of beam clusters, that is, the beam cluster A' and the beam cluster B' are formed, and a configuration of each beam cluster is recalculated.

In a sixth step, the recalculated configuration in the fifth step is performed.

Figure 14:
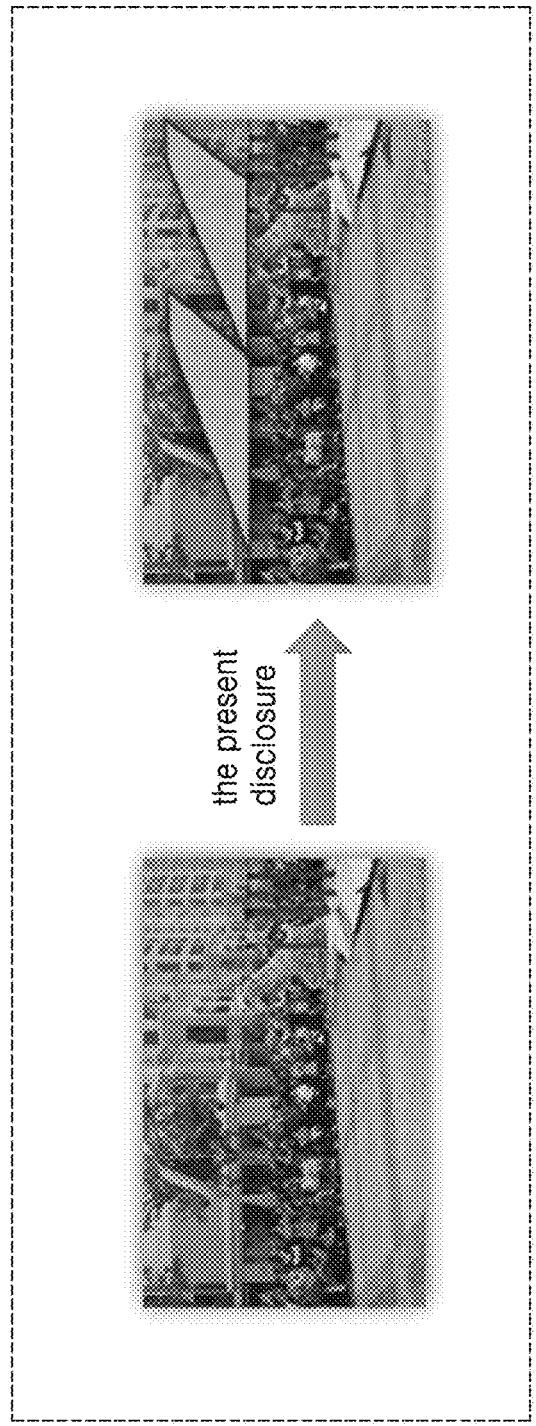
FIG. 14 illustrates an example of forming a new beam cluster when a traffic demand change event is detected.

FIG. 14 illustrates an example of forming a new beam cluster when a traffic demand change event is detected.

As shown in FIG. 14, a street or a community will have some festival activities or other celebration activities from time to time, which will gather many mobile users. In this case, it will trigger the event detection step, to re-cluster the beam clusters, and to re-calculate the configuration of the beam clusters and then the surge in traffic requirements is met.

According to an embodiment consistent with FIG. 14, specific steps for forming a beam cluster are:

In a first step, wireless data in a residential area is collected, and basic wireless data includes user location, time, beam service type, the number of beam traffic services, beam synchronization signal period, and transmitting power, signal quality, beam number, etc.

In a second step, the RB usage rate features in each beam is compared by using an average displacement method, and the beams are clustered into beam clusters.

In a third step, traffic is predicted for each beam cluster and a configuration of each beam cluster is calculated.

In a fourth step, the configuration in the third step is performed.

In a fifth step, a lion dance performance in the afternoon is predicted by searching keywords on the social platform.

In a sixth step, when the time gets close to the beginning of the lion dance performance, prediction values and actual values of each existing beam clusters are becoming more and more inaccurate, so the beam clusters need to be re-adjusted to form new beam clusters.

In a seventh step, a resource block RB usage rate in each beam cluster is predicted and a configuration is calculated.

In an eighth step, the configuration in the seventh step is performed.

In a ninth step, when the time gets close to the end of the lion dance performance, prediction values and actual values of the resource block RB usage rate of each existing beam clusters are becoming more and more inaccurate, so the beam clusters need to be re-adjusted to form new beam clusters.

In a tenth step, traffic within the beam cluster is predicted and a configuration is calculated.

In an eleventh step, the configuration in the tenth step is performed.

Figure 15:
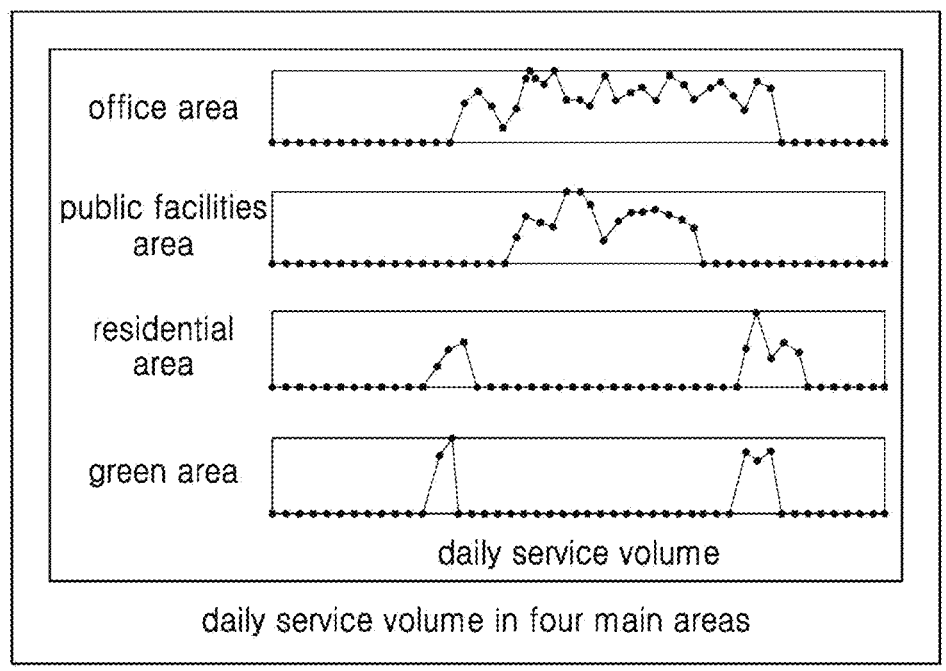
FIG. 15 illustrates an example of a time-traffic graph for four kinds of land type specific to a city.
Figure 16:
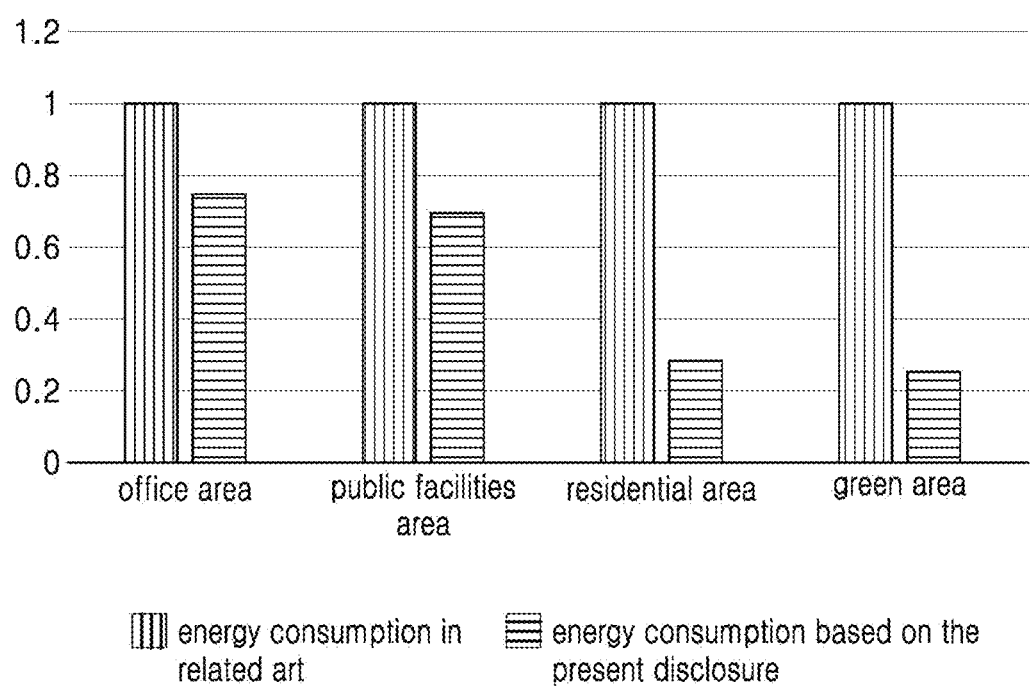
FIG. 16 illustrates an example of an energy saving effect based on the disclosure.
Figure 17:
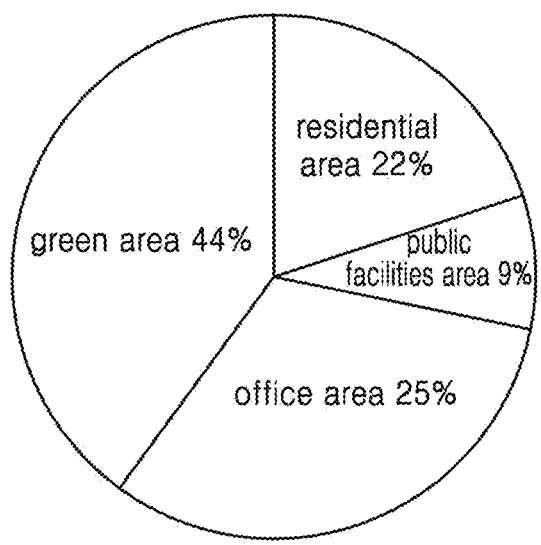
FIG. 17 illustrates the occupation ratio of four kinds of areas such as office areas, public facilities areas, residential areas and green areas in an example urban land planning.

FIG. 15 illustrates an example of a time traffic graph for four types of land specific to a city. In FIG. 15, service volume of office areas, public facilities areas, residential areas, and green areas at different times in a day is significantly different. FIG. 16 illustrates an example of an energy saving effect based on the disclosure. As shown in FIG. 16, the energy saved in the office areas, the public facilities areas, the residential areas, and the green areas are 26%, 31%, 71%, and 74%, respectively. FIG. 17 illustrates the occupation ratio of four kinds of areas such as office areas, public facilities areas, residential areas and green areas in an example urban land planning. In FIG. 17, the occupation ratio of the office areas, the public facilities areas, the residential areas, and the green areas are 25%, 9%, 22%, and 44%, respectively. Therefore, an average total energy saving value Es can be calculated according to the following Equation 4:

$$Es \approx 25\%*26\%+9\%*31\%+22\%*71\%+44\%*74\%=57.38\%.$$

In summary, the average total energy saving value based on the disclosure is 57.38%.

The beam configuring method according to the exemplary embodiments of the disclosure has been described above with reference to FIGS. 2 to 17. Hereinafter, a beam configuring device and units thereof according to the exemplary embodiments of the disclosure will be described with reference to FIG. 18 and FIG. 19.

The subject for performing the beam configuring method in the embodiments of the disclosure may be a base station or a server.

Figure 18:
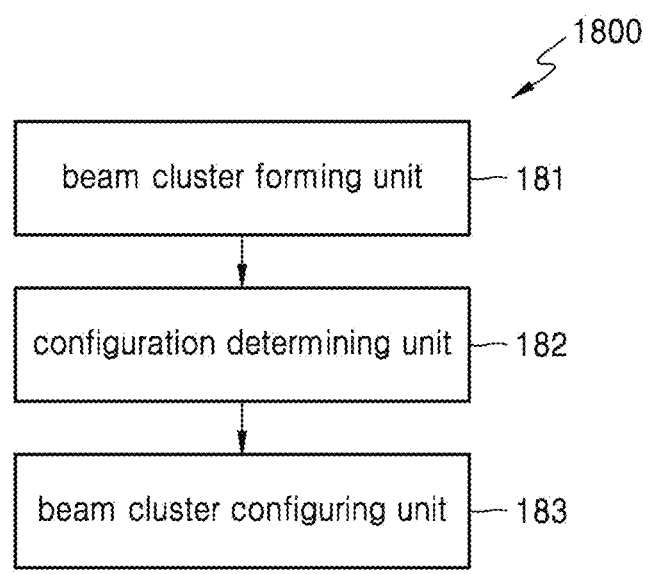
FIG. 18 illustrates a block diagram of a beam configuring device, according to an exemplary embodiment of the disclosure.

FIG. 18 illustrates a block diagram of a beam configuring device 1800, according to an exemplary embodiment of the disclosure.

Referring to FIG. 18, the beam configuring device 1800 includes a beam cluster forming unit 181, a configuration determining unit 182, and a beam cluster configuring unit 183.

The beam cluster forming unit 181 is configured to form at least one beam cluster from beams of a base station.

In exemplary embodiments of the disclosure, the beam configuring device 1800 may further include: a beam data collecting unit, configured to collect beam data of beams of a base station. Here, the beam data may at least include communication data. The communication data at least includes one of user location information, current time information, service type information about a beam, service traffic information about a beam, service distribution information about a beam, synchronization signal period information about a beam, transmitting power information about a beam, signal quality information, and beam number information. Here, the service type information includes at least one of statistics of users' moving speed, a service quality level identification for signal, and an uplink/downlink data ratio. Here, the service traffic includes at least one of a throughput, a resource block usage rate, an amount of IP data packet, and a number of accessed users. In exemplary embodiments of the disclosure, the beam cluster forming unit 181 may be configured to form at least one beam cluster from beams of the base station according to the beam data.

In exemplary embodiments of the disclosure, the beam cluster forming unit 181 may be configured to cluster beams with similar features into the same beam cluster according to the beam data.

In exemplary embodiments of the disclosure, the beam cluster forming unit 181 may be further configured to extract service feature information about each beam from the communication data in the beam data, wherein the service feature information includes at least one of service traffic information, service type information, and service distribution information, and cluster the at least one beam with similar features into one beam cluster according to the extracted service feature information.

In exemplary embodiments of the disclosure, the beam cluster forming unit 181 is further configured to cluster at least one beam among which feature similarity exceeds a first threshold into one beam cluster according to the extracted service feature information.

In exemplary embodiments of the disclosure, the beam cluster forming unit 181 is further configured to cluster beams with similar features into the same beam cluster based on an average displacement polymerization method according to the beam data.

In exemplary embodiments of the disclosure, the beam cluster forming unit 181 may be further configured to: acquire sample points corresponding to the beam data of each beam of the base station; select one sample point as center randomly from all sample points, and find out all sample points within a preset radius range of the center; calculate an average displacement vector of displacement vectors of all sample points to the center within the preset radius range of the center; cluster beams corresponding to all sample points in the preset radius range according to the average displacement vector; when there are beams that are not clustered, use sample points of all un-clustered beams as the all sample points, and select one sample point randomly from the all sample points as the center. The sample points and radius have been described in the description regarding FIG. 2, and related description will not be made any more.

In exemplary embodiments of the disclosure, the beam cluster forming unit 181 may be further configured to: acquire a service intensity heat map corresponding to the base station; and cluster at least one beam of the base station into one beam cluster based on color similarity in the service intensity heat map. The service intensity heat map and the service intensity have been described in the above description regarding FIG. 2, and related description will not be made any more.

In exemplary embodiments of the disclosure, the beam cluster forming unit 181 may be further configured to: determine a handover correlation between the beams according to a beam handover relationship corresponding to the base station; and cluster at least one beam of the base station into one beam cluster based on the handover correlation between the beams.

The configuration determining unit 182 may be configured to determine a configuration of the at least one beam cluster.

In exemplary embodiments of the disclosure, the configuration determining unit 182 may be further configured to: calculate a traffic prediction value of the beam cluster; and determine a configuration of the beam cluster based on the traffic prediction value of the beam cluster, wherein the configuration of the beam cluster includes at least one of a period of a synchronization signal SSB, a power level, a beam cluster bandwidth, a direction of a beam cluster, and an ON/OFF state of a beam cluster.

In exemplary embodiments of the disclosure, the configuration determining unit 182 may be further configured to: determine parameters of each time period kernel in a prediction model according to the communication data in the beam data of each beam in the beam clusters, to obtain a prediction model based on time sequences, wherein the prediction model includes a period kernel whose period granularity is based on hour; and determine a traffic prediction value for each beam cluster at a predetermined time using the prediction model based on time sequences.

The beam cluster configuring unit 183 may be configured to perform corresponding configuration on beams in the at least one beam cluster according to the determined configuration.

Figure 19:
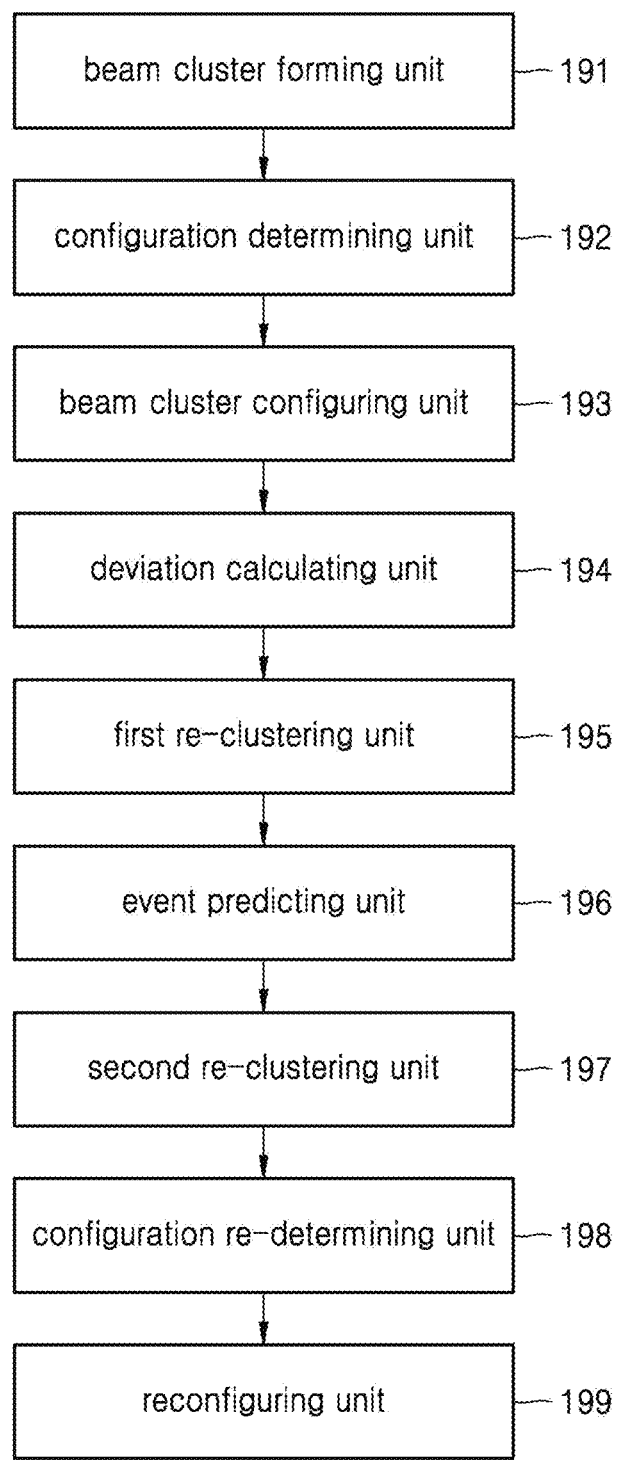
FIG. 19 illustrates a block diagram of a beam configuring device, according to an exemplary embodiment of the disclosure.

FIG. 19 illustrates a block diagram of a beam configuring device 1900, according to an exemplary embodiment of the disclosure.

Referring to FIG. 19, the beam configuring device 1900 includes a beam cluster forming unit 191, a configuration determining unit 192, a beam cluster configuring unit 193, a deviation calculating unit 194, a first re-clustering unit 195, an event predicting unit 196, a second re-clustering unit 197, a configuration re-determining unit 198, and a reconfiguring unit 199.

The beam cluster forming unit 191 is configured to form at least one beam cluster from beams of a base station.

The configuration determining unit 192 is configured to determine a configuration of the at least one beam cluster.

The beam cluster configuring unit 193 is configured to perform corresponding configuration on beams in the at least one beam cluster according to the determined configuration.

The deviation calculating unit 194 is configured to calculate a prediction deviation of the beam clusters according to the traffic prediction value and a traffic actual value of the beam clusters.

The first re-clustering unit 195 is configured to determine whether to re-cluster the beams within the beam cluster and beams associated with the beam cluster based on the calculated prediction deviation.

The event predicting unit 196 is configured to predict traffic demand change events according to data for predicting traffic demand change events included in the beam data.

In exemplary embodiments of the disclosure, the data for predicting a traffic demand change event may include at least one of climate data, network application data, multimedia data, transportation data, public utility data, and holiday data. The data for predicting a traffic demand change event may be collected periodically or in real time, or may be collected aperiodically.

The second re-clustering unit 197 is configured to re-cluster the beams in at least one beam cluster associated with a predicted traffic demand change event and beams associated with the at least one beam cluster, when the traffic demand change event is predicted.

The configuration re-determining unit 198 is configured to determine the configuration of the beam clusters obtained by the re-clustering.

The reconfiguring unit 199 is configured to perform corresponding configuration on beams in the re-clustered beam clusters according to the determined configuration.

In addition, according to the exemplary embodiments of the disclosure, a computer readable storage medium having a computer program stored thereon is provided, wherein when the computer program is being executed, steps of the beam configuring method according to the disclosure are implemented.

In exemplary embodiments of the disclosure, when the computer program is being executed, the following steps may be implemented: forming at least one beam cluster from beams of a base station; determining a configuration of the at least one beam cluster; performing corresponding configuration on beams in the at least one beam cluster according to the determined configuration.

The computer readable storage medium may be, for example, but not limited to, an electronic, magnetic, optical, electromagnetic, infrared, or semiconductor system, device, or, equipment or any combination of the above. More specific examples of computer readable storage media may include, but not limited to, electrical connections having one or more wires, portable computer disks, hard disks, random access memory (RAM), read only memory (ROM), erasable Programmable read only memory (EPROM or flash memory), optical fiber, portable compact disk read only memory (CD-ROM), optical storage device, magnetic storage device, or any suitable combination of the above mentioned. In the embodiments of the disclosure, a computer readable storage medium may be any tangible medium that can contain or store a computer program, which can be used by or in connection with an instruction execution system, device, or, equipment. The computer program embodied on the computer readable storage medium can be transmitted by any suitable medium, including but not limited to: wire, fiber optic cable, RF (radio frequency), etc., or any suitable combination of the foregoing. The computer readable storage medium can be included in any device; it can also be separately and not incorporated into the device.

Beam configuring devices according to the exemplary embodiments of the disclosure has been described above with reference to FIG. 18 to FIG. 19. Hereinafter, electronic apparatus according to the exemplary embodiments of the disclosure will be described with reference to FIG. 20.

Figure 20:
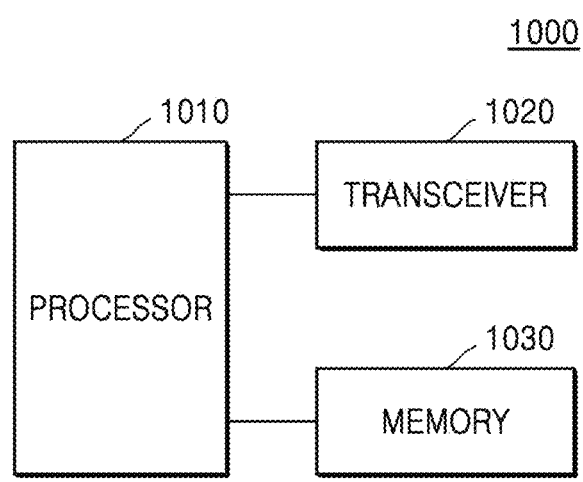
FIG. 20 illustrates a schematic diagram of an apparatus, according to an exemplary embodiment of the disclosure.

FIG. 20 illustrates a schematic diagram of an apparatus 1000, according to an exemplary embodiment of the disclosure.

Referring to FIG. 20, the apparatus 1000 according to an exemplary embodiment of the disclosure includes a processor 1010, a transceiver 1020, and a memory 1030. However, all of the illustrated components are not essential. The apparatus 1000 may be implemented by more or less components than those illustrated in FIG. 20. In addition, the processor 1010, the transceiver 1020 and the memory 1030 may be implemented as a single chip according to another embodiment.

In an exemplary embodiment, the apparatus 1000 may be a base station. In an exemplary embodiment, the apparatus 1000 may be the gNodeB.

The aforementioned components will now be described in detail.

The processor 1010 may include one or more processors or other processing devices that control the proposed function, process, and/or method. Operation of the apparatus 1000 may be implemented by the processor 1010.

In exemplary embodiments of the disclosure, the processor 1010 may be configured to: forming at least one beam cluster from beams of a base station; determining a configuration of the at least one beam cluster; performing corresponding configuration on beams in the at least one beam cluster according to the determined configuration.

The transceiver 1020 may include an RF transmitter for up-converting and amplifying a transmitted signal according to an example embodiment, and an RF receiver for down-converting a frequency of a received signal. However, according to another embodiment, the transceiver 1020 may be implemented by more or less components than those illustrated in components.

The transceiver 1020 may be connected to the processor 1010 and transmit and/or receive a signal. The signal may include control information and data. In addition, the transceiver 1020 may receive the signal through a wireless channel and output the signal to the processor 1010. The transceiver 1020 may transmit a signal output from the processor 1010 through the wireless channel.

The memory 1030 may store the control information or the data included in a signal obtained by the apparatus 1000. The memory 1030 may be connected to the processor 1010 and store at least one instruction or a protocol or a parameter for the proposed function, process, and/or method. The memory 1030 may include read-only memory (ROM) and/or random access memory (RAM) and/or hard disk and/or CD-ROM and/or DVD and/or other storage devices.

A computer program may be stored in the memory 1030 and operable on the processor 1010, wherein when executing the computer program, the processor 1010 performs the steps of the beam configuring method according to the disclosure.

The electronic apparatus shown in FIG. 20 is merely an example, and should not impose any limitation on the function and scope of use of the embodiments of the disclosure.

A beam configuring method and device, an electronic apparatus and a computer readable storage medium according to an exemplary embodiment of the disclosure have been described above with reference to FIGS. 1-20. However, it should be understood that the beam configuring device and units therein shown in FIGS. 18 and 19 may be respectively configured to execute software, hardware, firmware, or any combination of them of a specific function. The electronic apparatus as shown in FIG. 20 is not limited to including the components shown above, but some components may be added or deleted as needed, and the above components may also be combined.

The beam configuring method and device, the electronic apparatus and the computer readable storage medium according to an exemplary embodiment of the disclosure, by firstly forming at least one beam cluster from beams of a base station, and then determining a configuration of the at least one beam cluster, finally performing corresponding configuration on beams in the at least one beam cluster according to the determined configuration, so that beams with different beam features are clustered into different beam clusters, and different configuration parameters are configured for different beam clusters, thereby implementing smaller-scale and more precise area division performed on space in the cell coverage, and implementing fine-grained control, and saving energy consumption of the base station.

Those skilled in the art may understand achieving all or a portion of the steps carried out by the method embodiments described above may be accomplished through commanding the associated hardware by a program, the program may be stored in a computer readable storage medium, when it is executed, one of the steps of the method embodiments or a combination thereof is included.

In addition, the functional units in the various embodiments of the present application may be integrated in a processing module, or each unit may be physically present individually, or two or more units may be integrated in one module. The integrated module may be implemented in the form of hardware, and may also be achieved in the form of software function modules. The integrated module may also be stored in a computer-readable storage medium if it is implemented in the form of a software function module and is sold or used as a standalone product.

Although the present disclosure has been particularly shown and described with reference to exemplary embodiments thereof, it will be understood by those skilled in the art that various changes in form and details may be made therein without departing from the spirit and scope of the present disclosure as defined by the following claims.

What is claimed is:

1. An apparatus for beam configuration in a wireless communication system, the apparatus comprising:
    a transceiver; and
    at least one processor connected with the transceiver and configured to:
        obtain beam data of a plurality of beams of a base station;
        determine feature similarity between two beams among the plurality of beams, based on the beam data;
        form at least one beam cluster from the plurality of beams, wherein at least two beams with similar features are clustered into a beam cluster, based on determining that the feature similarity between the two beams exceeds a threshold;
        determine a configuration of the at least one beam cluster; and
        configure the plurality of beams in the at least one beam cluster according to the determined configuration.

2. The apparatus of claim 1, wherein the beam data comprises at least one of user location information, current time information, service type information about at least one beam, service traffic information about the at least one beam, service distribution information about the at least one beam, synchronization signal period information about the at least one beam, transmitting power information about the at least one beam, signal quality information, or beam number information.

3. The apparatus of claim 2, wherein the service type information comprises at least one of statistics of users' moving speed, a service quality level identification of a signal, or an uplink/downlink data ratio, and
    wherein the service traffic information comprises at least one of a throughput, a resource block usage rate, an amount of Internet protocol (IP) data packets, or a number of accessed users.

4. The apparatus of claim 1, wherein the at least one processor is further configured to:
   extract service feature information about each of the plurality of beams from the beam data, wherein the service feature information comprises at least one of service traffic information, service type information, and service distribution information; and
   cluster the plurality of beams with the similar features into the beam cluster according to the extracted service feature information.

5. The apparatus of claim 1, wherein the at least one processor is further configured to cluster the plurality of beams with the similar features into the beam cluster based on an average displacement polymerization based on the beam data.

6. The apparatus of claim 5, wherein the at least one processor is further configured to:
   acquire sample points corresponding to the beam data;
   select one sample point as a center randomly from among the sample points, and determine other sample points within a preset radius range of the center;
   calculate an average displacement vector of displacement vectors of the other sample points within the preset radius range to the center;
   cluster other beams corresponding to the other sample points according to the average displacement vector; and
   by using sample points of un-clustered beams as the sample points, repeat the selecting, the calculating, and the clustering as long as the un-clustered beams remain.

7. The apparatus of claim 1, wherein the at least one processor is further configured to:
   acquire a service intensity heat map corresponding to the base station; and
   cluster the at least two beams of the base station into the beam cluster based on color similarity in the service intensity heat map.

8. The apparatus of claim 1, wherein the at least one processor is further configured to:
   determine a handover correlation between the plurality of beams according to a beam handover relationship corresponding to the base station; and
   cluster at least one beam of the base station into one beam cluster of the at least one beam cluster based on the handover correlation between the plurality of beams.

9. The apparatus of claim 1, wherein the at least one processor is further configured to:
   calculate a traffic prediction value of the at least one beam cluster; and
   determine the configuration of the at least one beam cluster based on the traffic prediction value of the at least one beam cluster,
   wherein the configuration of the at least one beam cluster comprises at least one of a period of a synchronization signal block (SSB), a power level, a beam cluster bandwidth, a direction of the at least one beam cluster, or an ON/OFF state of the at least one beam cluster.

10. The apparatus of claim 9, wherein the at least one processor is further configured to:
    determine parameters of each time period kernel in a prediction model according to communication data in beam data of each beam in the at least one beam cluster,
    obtain the prediction model based on time sequences, wherein the prediction model comprises a period kernel having a period granularity is based on hour; and
    determine the traffic prediction value for the at least one beam cluster at a predetermined time using the prediction model based on the time sequences.

11. The apparatus of claim 1, wherein after the plurality of beams in the at least one beam cluster are configured, the at least one processor is further configured to:
    calculate a prediction deviation of the at least one beam cluster according to a traffic prediction value and an actual traffic value of the at least one beam cluster;
    determine whether to re-cluster the plurality of beams and other beams associated with the at least one beam cluster based on the calculated prediction deviation;
    determine a re-cluster configuration of a re-clustered beam cluster obtained by the re-clustering; and
    configure the plurality of beams and the other beams in the re-clustered beam cluster according to the determined re-cluster configuration.

12. The apparatus of claim 1,
    wherein the beam data comprises at least data for predicting traffic demand change events,
    wherein the at least one processor is further configured to:
    predict a traffic demand change event according to data for predicting the traffic demand change event included in the beam data;
    based on determining that the at least one beam cluster is associated with the predicted traffic demand change event, re-cluster the plurality of beams in the at least one beam cluster and other beams associated with the at least one beam cluster, when the traffic demand change event is predicted;
    determine a re-cluster configuration of a re-clustered beam cluster obtained by the re-clustering; and
    configure the plurality of beams and the other beams in the re-clustered beam cluster according to the determined re-cluster configuration.

13. The apparatus of claim 12, wherein the data for predicting the traffic demand change event comprises at least one of climate data, network application data, multimedia data, transportation data, public utility data, or holiday data.

14. A method for beam configuration in a wireless communication system, the method comprising:
    obtaining beam data of a plurality of beams of a base station;
    determining feature similarity between two beams among the plurality of beams, based on the beam data;
    forming at least one beam cluster from the plurality of beams, wherein at least two beams with similar features are clustered into a beam cluster, based on determining that the feature similarity between the two beams exceeds a threshold;
    determining a configuration of the at least one beam cluster; and
    configuring the plurality of beams in the at least one beam cluster according to the determined configuration.

15. The method of claim 14, further comprising:
    calculating a prediction deviation of the at least one beam cluster according to a traffic prediction value and an actual traffic value of the at least one beam cluster;
    determining whether to re-cluster the plurality of beams and other beams associated with the at least one beam cluster based on the calculated prediction deviation;
    determining a re-cluster configuration of a re-clustered beam cluster obtained by the re-clustering; and
    configuring the plurality of beams and the other beams in the re-clustered beam cluster according to the determined re-cluster configuration.

16. A non-transitory computer readable storage medium configured to store instructions which, when executed by at least one processor of a device for beam configuration, cause the at least one processor to:
- obtain beam data of a plurality of beams of a base station;
- determine feature similarity between two beams among the plurality of beams, based on the beam data;
- form at least one beam cluster from the plurality of beams of a base station, wherein at least two beams with similar features are clustered into a beam cluster, based on determining that the feature similarity between the two beams exceeds a threshold;
- determine a configuration of the at least one beam cluster; and
- configure the plurality of beams in the at least one beam cluster according to the determined configuration.

17. The non-transitory computer readable storage medium of claim 16, wherein the instructions are further configured to cause the at least one processor to, after the beams in the at least one beam cluster are configured:
- calculate a prediction deviation of the at least one beam cluster according to a traffic prediction value and an actual traffic value of the at least one beam cluster;
- determine whether to re-cluster the plurality of beams and other beams associated with the at least one beam cluster based on the calculated prediction deviation;
- determine a re-cluster configuration of a re-clustered beam cluster obtained by the re-clustering;
- configure the plurality of beams and the other beams in the re-clustered beam cluster according to the determined re-cluster configuration.

\* \* \* \* \*